United States Patent [19]
Yoshida

[11] Patent Number: 5,852,680
[45] Date of Patent: Dec. 22, 1998

[54] CHARACTER PROCESSING APPARATUS AND A CHARACTER PROCESSING METHOD

[75] Inventor: Masayuki Yoshida, Yokohama, Japan

[73] Assignee: Canon Kabushiki Kaisha, Tokyo, Japan

[21] Appl. No.: 566,169

[22] Filed: Dec. 1, 1995

[30] Foreign Application Priority Data

Dec. 5, 1994 [JP] Japan .................................... 6-300879

[51] Int. Cl.⁶ ..................................................... G06K 9/44
[52] U.S. Cl. .......................................... 382/258; 382/200
[58] Field of Search ..................................... 382/293, 298, 382/181, 199, 200, 201, 258; 395/167, 169, 170, 171, 172; 345/143, 127, 128, 129

[56] References Cited

U.S. PATENT DOCUMENTS

| | | | |
|---|---|---|---|
| 4,897,638 | 1/1990 | Kokunishi et al. .............. | 345/142 |
| 5,097,426 | 3/1992 | Kawamura et al. ............ | 395/110 |
| 5,170,442 | 12/1992 | Murai et al. .................. | 382/258 |
| 5,398,311 | 3/1995 | Seto ............................ | 395/151 |
| 5,450,096 | 9/1995 | Yoshida et al. ............... | 345/141 |
| 5,509,091 | 4/1996 | Aoki ............................ | 382/298 |
| 5,519,412 | 5/1996 | Watanabe .................... | 345/128 |

FOREIGN PATENT DOCUMENTS 7-160241  6/1995  Japan .
7-160242  6/1995  Japan .

*Primary Examiner*—Yon J. Couso
*Attorney, Agent, or Firm*—Fitzpatrick, Cella, Harper & Scinto

[57] ABSTRACT

Character pattern data that are formed from outline data are stored. A thickening amount or a narrowing amount is input to thicken or narrow the character pattern. A coordinate value for the stored outline data is transformed based on the thickening amount or the narrowing amount that is input. A shape of an outline is determined when a transformation is to be performed, and coordinates that are to be transformed are adjusted based on a determination result. Since the adjustment is performed by referring to the shape of the outline, character data, such as bit map data and gray scale data, of high quality can be provided.

30 Claims, 37 Drawing Sheets

MEDIUM MINCHO

BOLD MINCHO

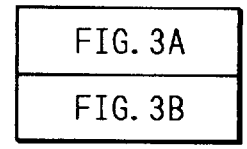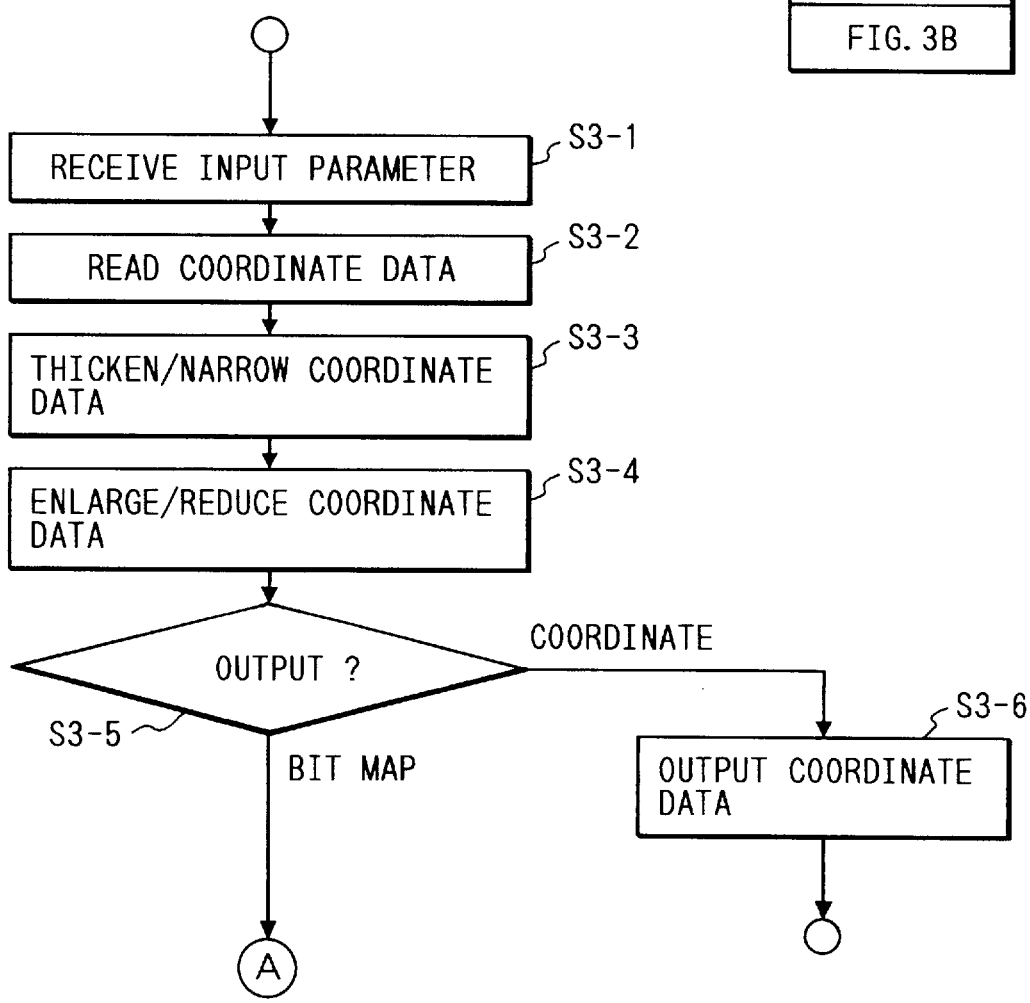

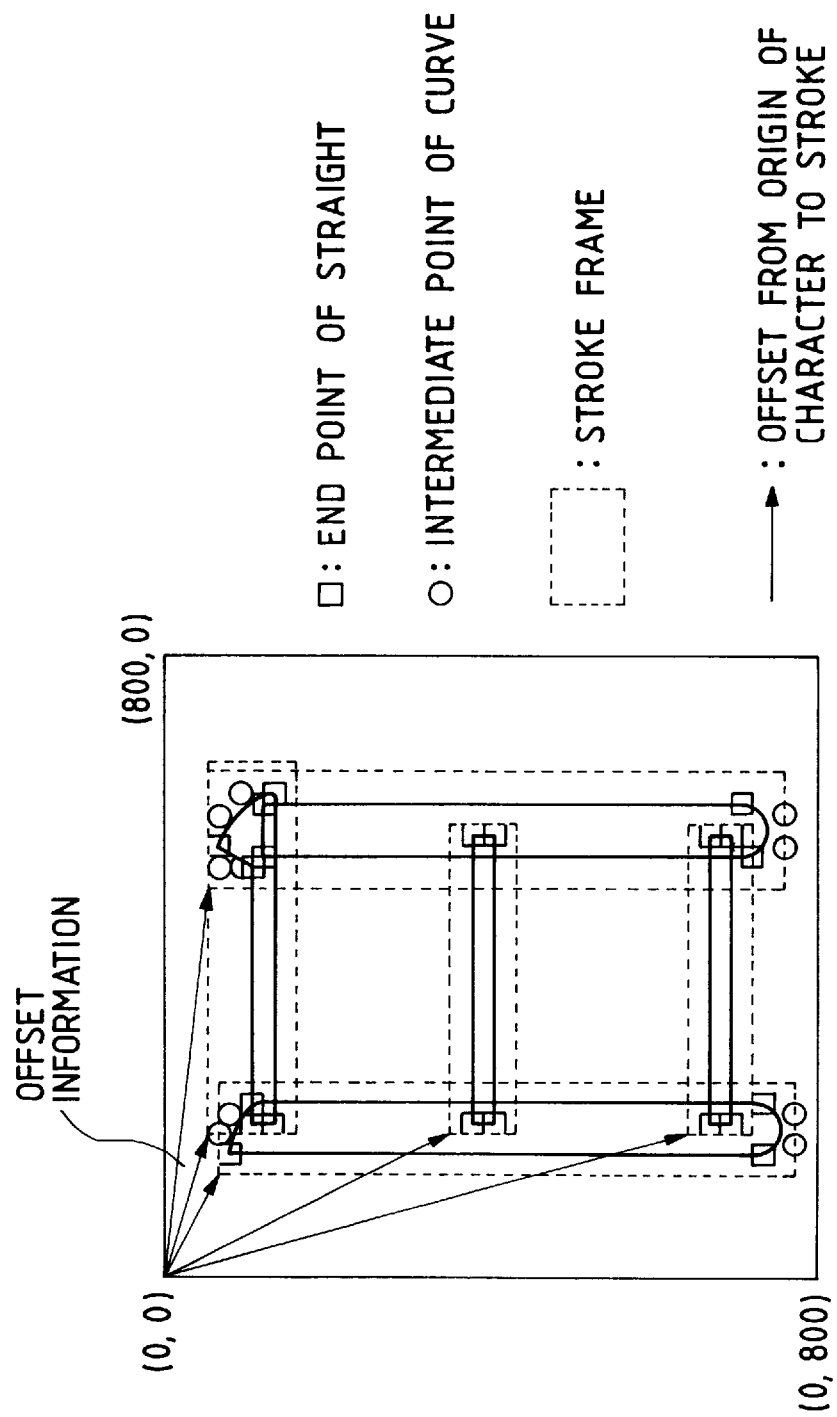

FIG. 5

| THE NOS OF OUTLINES |
| --- |
| NO OF END POINT OF 1ST OUTLINE |
| OFFSET X TO 1ST OUTLINE |
| OFFSET Y TO 1ST OUTLINE |
| NO OF END POINT OF 2ND OUTLINE |
| OFFSET X TO 2ND OUTLINE |
| OFFSET Y TO 2ND OUTLINE |
| ⋮ |
| NO OF END POINT OF NTH OUTLINE |
| OFFSET X TO NTH OUTLINE |
| OFFSET Y TO NTH OUTLINE |
| COORDINATE VALUE OF X0 |
| COORDINATE VALUE OF Y0 |
| ATTRIBUTE OF 0TH POINT |
| COORDINATE VALUE OF X1 |
| COORDINATE VALUE OF Y1 |
| ATTRIBUTE OF 1ST POINT |
| COORDINATE VALUE OF X2 |
| COORDINATE VALUE OF Y2 |
| ATTRIBUTE OF 2ND POINT |
| ⋮ |
| COORDINATE VALUE OF XM |
| COORDINATE VALUE OF YM |
| ATTRIBUTE OF MTH POINT |

| Y | Xstart | Xend | Xstart | Xend | Xstart | Xend |
|---|---|---|---|---|---|---|
| 0 |  |  |  |  |  |  |
| 1 | 10 | 11 |  |  |  |  |
| 2 | 2 | 3 | 2 | 12 |  |  |
| 3 | 2 | 3 | 2 | 12 |  |  |
| 4 | 2 | 3 | 10 | 11 |  |  |
| 5 | 2 | 3 | 10 | 11 |  |  |
| 6 | 2 | 3 | 10 | 11 | 10 | 11 |
| 7 | 2 | 3 | 2 | 12 |  |  |
| 8 | 2 | 3 | 2 | 12 | 10 | 11 |
| 9 | 2 | 3 | 10 | 11 | 10 | 11 |
| 10 | 2 | 3 | 10 | 11 |  |  |
| 11 | 2 | 3 | 10 | 11 |  |  |
| 12 | 2 | 3 | 2 | 12 | 10 | 11 |
| 13 | 2 | 3 | 10 | 11 |  |  |
| 14 |  |  |  |  |  |  |

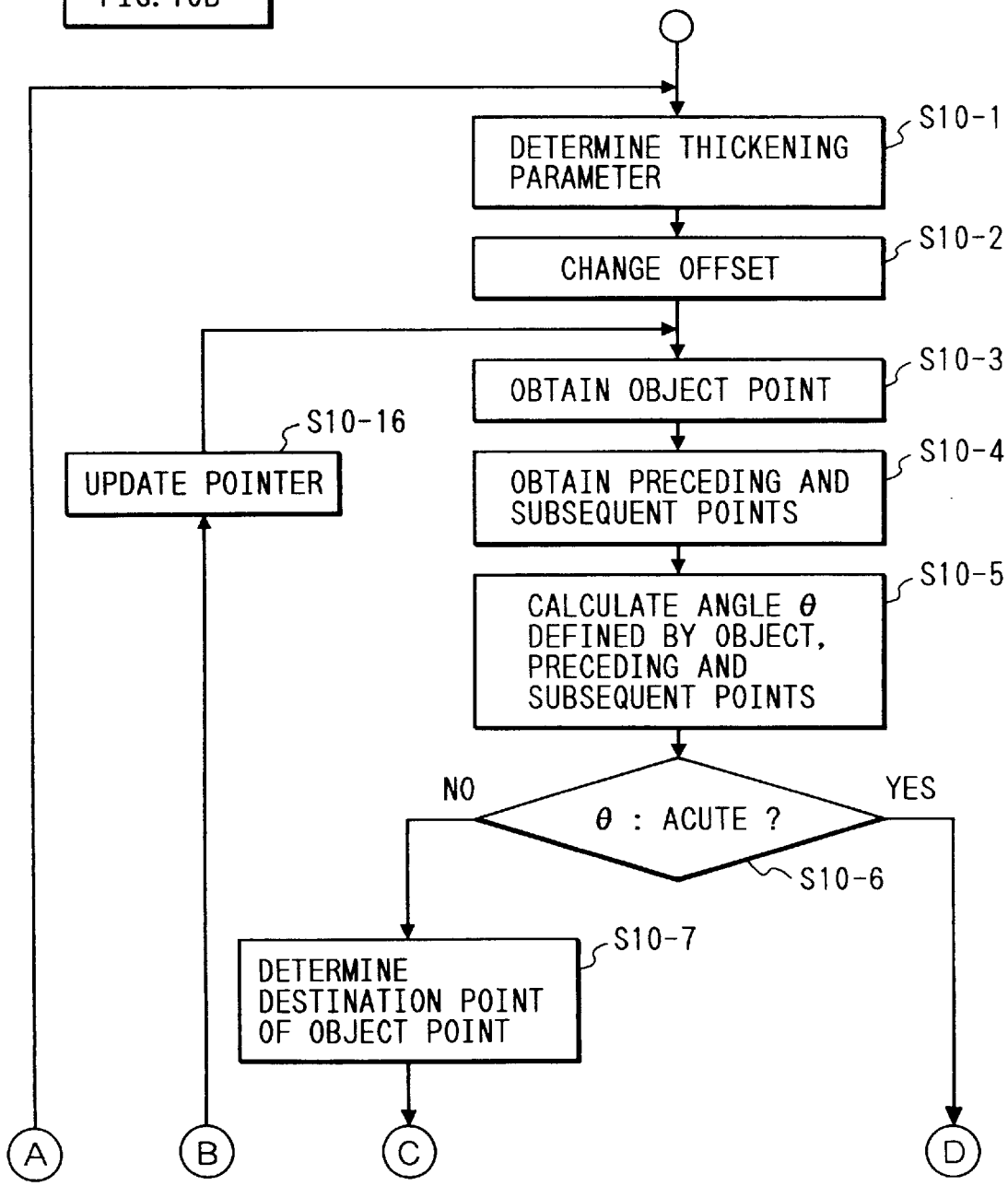

MEDIUM MINCHO

BOLD MINCHO

ROUND GOTHIC

BOLD ROUND GOTHIC

| STYLE | MINCHO | | ROUND GOTHIC | |
|---|---|---|---|---|
| x/y | x | y | x | y |
| ULTRA FINE | 6 | 10 | 10 | 10 |
| FINE | 9 | 15 | 15 | 15 |
| MEDIUM | 12 | 20 | 20 | 20 |
| BOLD | 15 | 25 | 25 | 25 |
| ULTRA BOLD | 18 | 30 | 30 | 30 |

FIG. 20A

| STYLE | MINCHO | | | ROUND GOTHIC | | |
|---|---|---|---|---|---|---|
| x/y | x | y | PRESENCE | x | y | PRESENCE |
| WEIGHT ULTRA FINE 1 | 3 | 5 | | 5 | 5 | |
| FINE 2 | 5 | 10 | | 10 | 10 | |
| MEDIUM-FINE 3 | 7 | 15 | ○ | 15 | 15 | |
| MEDIUM 4 | 10 | 20 | | 20 | 20 | |
| MEDIUM BOLD 5 | 12 | 25 | | 25 | 25 | ○ |
| BOLD 6 | 14 | 30 | | 30 | 30 | |
| ULTRA BOLD 7 | 16 | 35 | ○ | 35 | 35 | |

FIG. 20B

| STYLE | ANGULAR GOTHIC | | | KAISHO | | |
|---|---|---|---|---|---|---|
| x/y | x | y | PRESENCE | x | y | PRESENCE |
| WEIGHT ULTRA FINE 1 | 5 | 5 | | 3 | 5 | |
| FINE 2 | 10 | 10 | | 6 | 10 | |
| MEDIUM-FINE 3 | 15 | 15 | | 9 | 15 | |
| MEDIUM 4 | 20 | 20 | | 12 | 20 | ○ |
| MEDIUM BOLD 5 | 25 | 25 | | 15 | 25 | |
| BOLD 6 | 30 | 30 | ○ | 18 | 30 | |
| ULTRA BOLD 7 | 35 | 35 | | 21 | 35 | ○ |

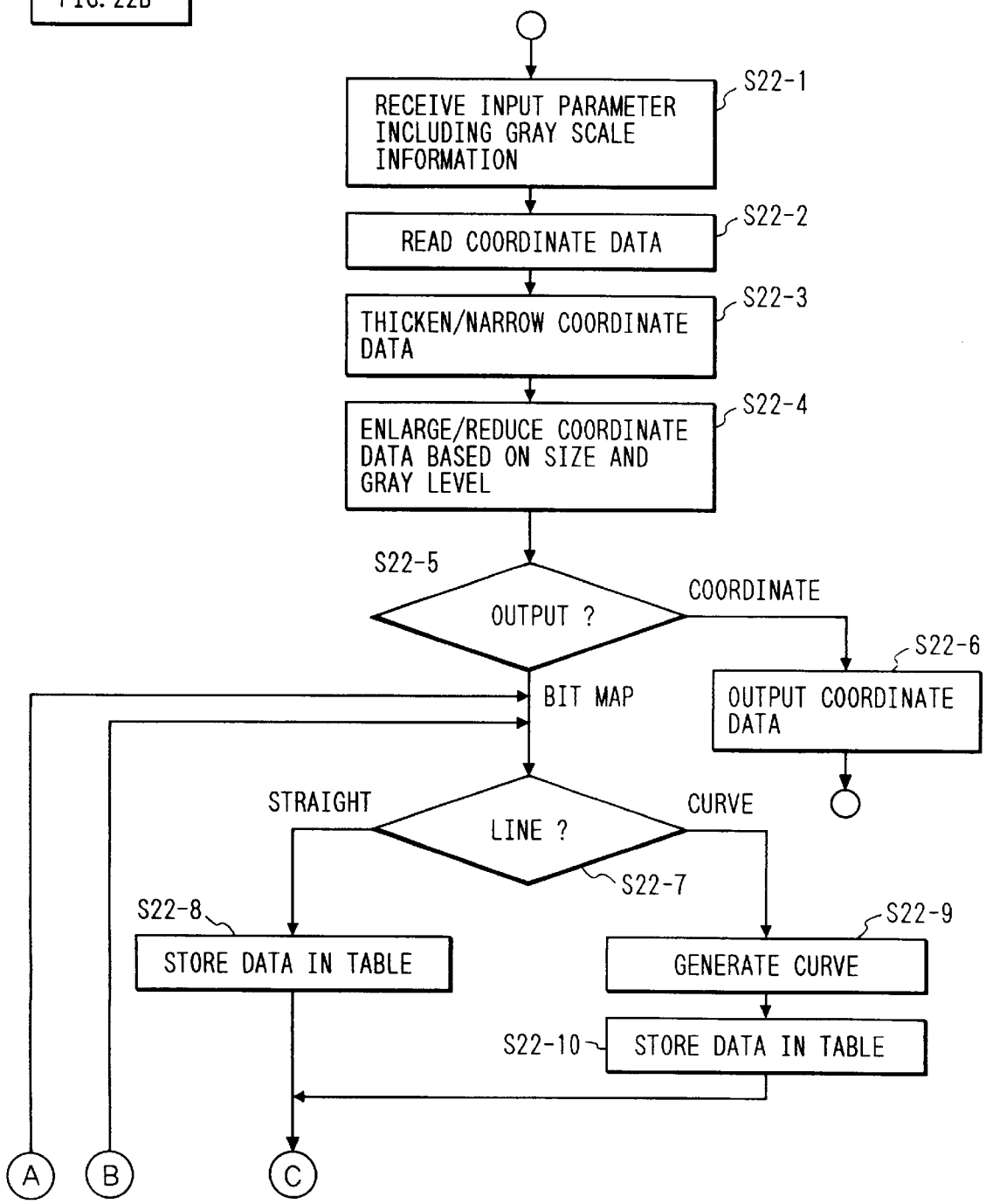

FIG. 23A

| 1 | 1 | 1 | 1 |
|---|---|---|---|
| 1 | 1 | 1 | 1 |
| 1 | 1 | 1 | 1 |
| 1 | 1 | 1 | 1 |

FIG. 23B

| 0.8 | 0.8 | 0.8 | 0.8 |
|---|---|---|---|
| 0.8 | 1.6 | 1.6 | 0.8 |
| 0.8 | 1.6 | 1.6 | 0.8 |
| 0.8 | 0.8 | 0.8 | 0.8 |

FIG. 23C

| 1.1 | 1.1 | 1.1 | 1.1 |
|---|---|---|---|
| 1.1 | 0.7 | 0.7 | 1.1 |
| 1.1 | 0.7 | 0.7 | 1.1 |
| 1.1 | 1.1 | 1.1 | 1.1 |

| 0 | 0 | 0  | 0 | 0 | 0 | 0 | 0 | 0  | 0 | 0 | 0 |
|---|---|----|---|---|---|---|---|----|---|---|---|
| 0 | 0 | 10 | 9 | 8 | 8 | 8 | 9 | 13 | 5 | 0 | 0 |
| 0 | 0 | 12 | 3 | 0 | 0 | 0 | 0 | 12 | 4 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 9 | 8 | 8 | 8 | 8 | 13 | 3 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 9 | 8 | 8 | 8 | 8 | 12 | 2 | 0 | 0 |
| 0 | 0 | 2  | 1 | 0 | 0 | 0 | 0 | 0  | 0 | 0 | 0 |

□ : END POINT OF STRAIGHT

○ : INTERMEDIATE POINT OF CURVE

*FIG. 28*

| THE NOS OF OUTLINES |
|---|
| NO OF END POINT OF 1ST OUTLINE |
| NO OF END POINT OF 2ND OUTLINE |
| ⋮ |
| NO OF END POINT OF NTH OUTLINE |
| COORDINATE VALUE OF X0 |
| COORDINATE VALUE OF Y0 |
| ATTRIBUTE OF 0TH POINT |
| COORDINATE VALUE OF X1 |
| COORDINATE VALUE OF Y1 |
| ATTRIBUTE OF 1ST POINT |
| COORDINATE VALUE OF X2 |
| COORDINATE VALUE OF Y2 |
| ATTRIBUTE OF 2ND POINT |
| ⋮ |
| COORDINATE VALUE OF XM |
| COORDINATE VALUE OF YM |
| ATTRIBUTE OF MTH POINT |

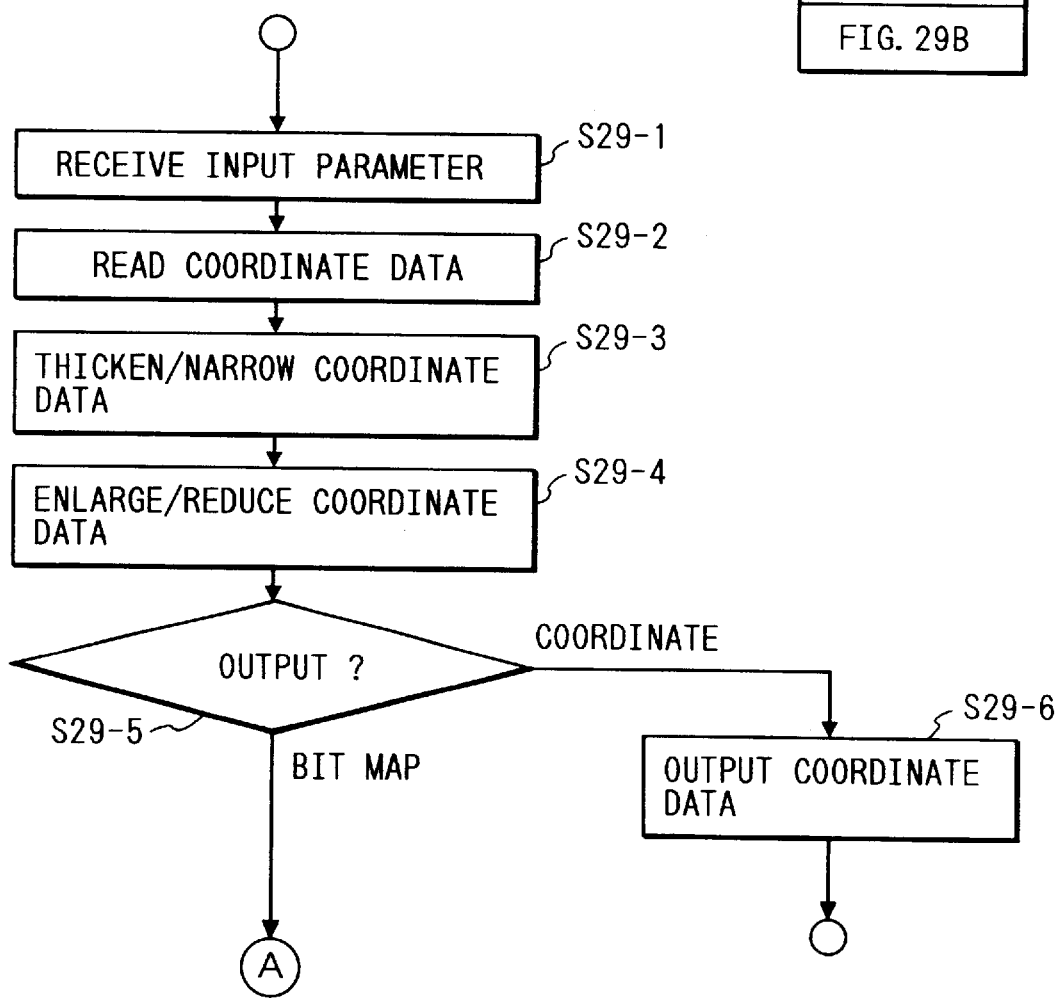

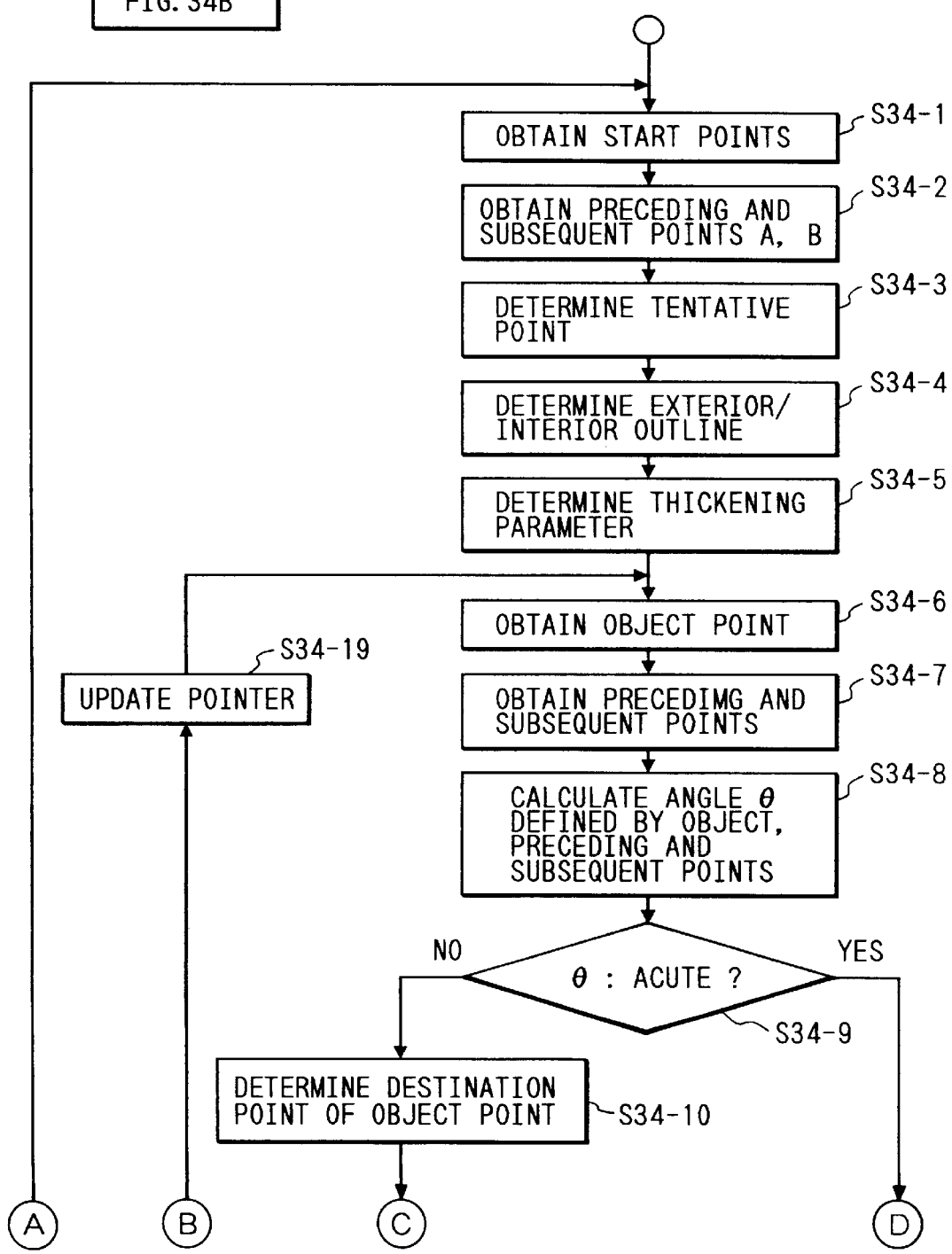

MEDIUM MINCHO    BOLD MINCHO

ROUND GOTHIC

BOLD ROUND GOTHIC

CCW EXTERIOR OUTLINE

FIG. 38

| STYLE | MINCHO | | | | ROUND GOTHIC | | | |
|---|---|---|---|---|---|---|---|---|
| EXTERIOR/INTERIOR | EXTERIOR OUTLINE | | INTERIOR OUTLINE | | EXTERIOR OUTLINE | | INTERIOR OUTLINE | |
| x/y | x | y | x | y | x | y | x | y |
| ULTRA FINE | 6 | 10 | 5 | 8 | 10 | 10 | 8 | 8 |
| FINE | 9 | 15 | 7 | 13 | 15 | 15 | 13 | 13 |
| MEDIUM | 12 | 20 | 10 | 18 | 20 | 20 | 18 | 18 |
| BOLD | 15 | 25 | 13 | 23 | 25 | 25 | 23 | 23 |
| ULTRA BOLD | 18 | 30 | 16 | 28 | 30 | 30 | 28 | 28 |

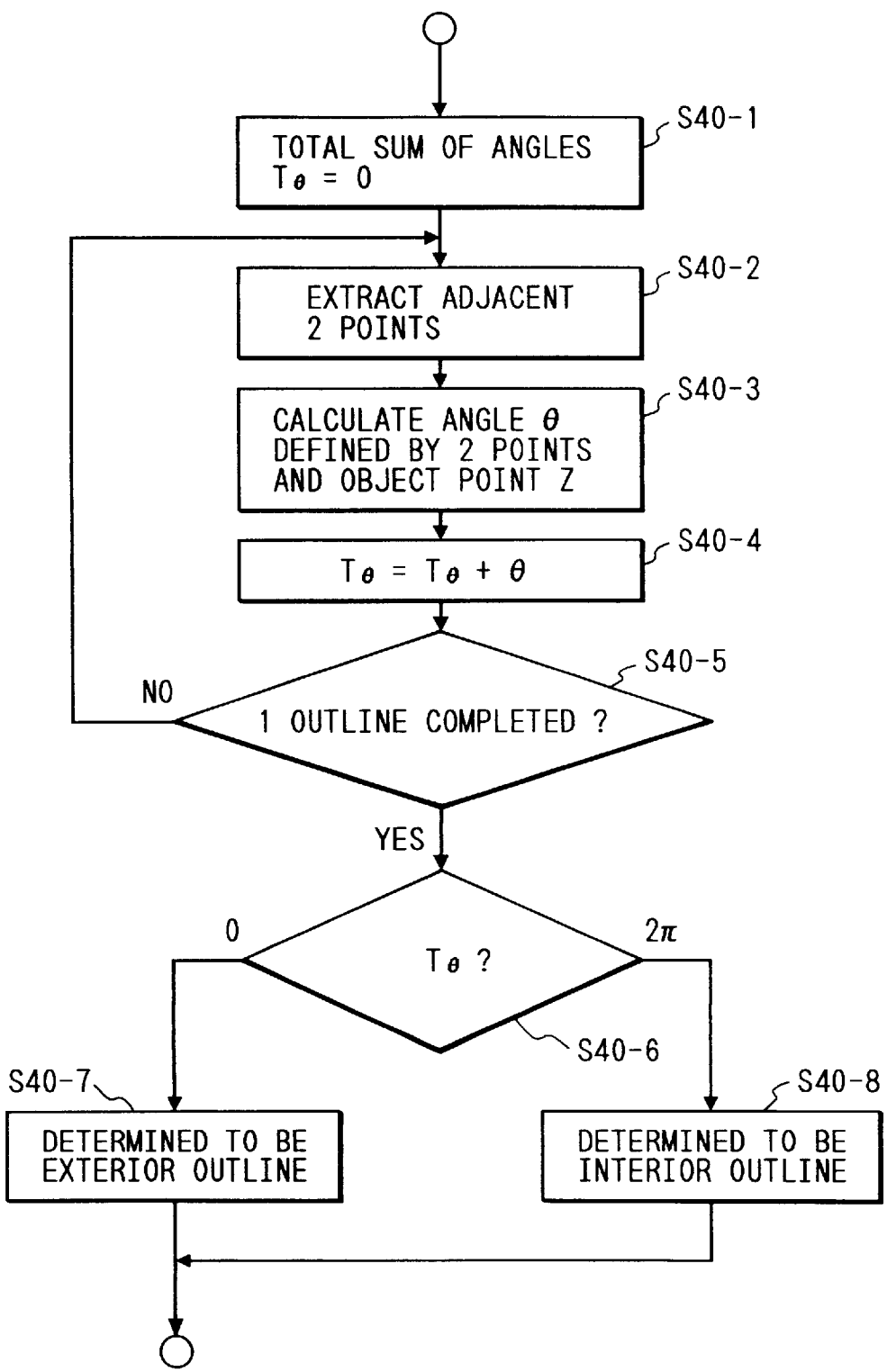

FIG. 43A

| STYLE | MINCHO | | | | ROUND GOTHIC | | | | |
|---|---|---|---|---|---|---|---|---|---|
| EXT/INT PRESENCE | EXTERIOR OUTLINE | | INTERIOR OUTLINE | | PRESENCE | EXTERIOR OUTLINE | | INTERIOR OUTLINE | | PRESENCE |
| x/y | x | y | x | y | | x | y | x | y | |
| WEIGHT ULTRA FINE 1 | 3 | 5 | 2 | 5 | | 5 | 5 | 3 | 3 | |
| FINE 2 | 5 | 10 | 4 | 8 | | 10 | 10 | 8 | 8 | |
| MEDIUM-FINE 3 | 7 | 15 | 6 | 13 | ○ | 15 | 15 | 13 | 13 | |
| MEDIUM 4 | 10 | 20 | 9 | 18 | | 20 | 20 | 18 | 18 | |
| MEDIUM BOLD 5 | 12 | 25 | 11 | 23 | | 25 | 25 | 23 | 23 | ○ |
| BOLD 6 | 14 | 30 | 13 | 28 | | 30 | 30 | 28 | 28 | |
| ULTRA BOLD 7 | 16 | 35 | 15 | 33 | ○ | 35 | 35 | 33 | 33 | |

FIG. 43B

| STYLE | ANGULAR GOTHIC | | | | | KAISHO | | | | |
|---|---|---|---|---|---|---|---|---|---|---|
| EXT/INT PRESENCE | EXTERIOR OUTLINE | | INTERIOR OUTLINE | | PRESENCE | EXTERIOR OUTLINE | | INTERIOR OUTLINE | | PRESENCE |
| x/y | x | y | x | y | | x | y | x | y | |
| WEIGHT ULTRA FINE 1 | 5 | 5 | 3 | 3 | | 3 | 5 | 3 | 5 | |
| FINE 2 | 10 | 10 | 8 | 8 | | 6 | 10 | 5 | 8 | |
| MEDIUM-FINE 3 | 15 | 15 | 13 | 13 | | 9 | 15 | 7 | 13 | |
| MEDIUM 4 | 20 | 20 | 18 | 18 | | 12 | 20 | 10 | 18 | ○ |
| MEDIUM BOLD 5 | 25 | 25 | 23 | 23 | | 15 | 25 | 13 | 23 | |
| BOLD 6 | 30 | 30 | 28 | 28 | ○ | 18 | 30 | 16 | 28 | |
| ULTRA BOLD 7 | 35 | 35 | 33 | 33 | | 21 | 35 | 19 | 33 | ○ |

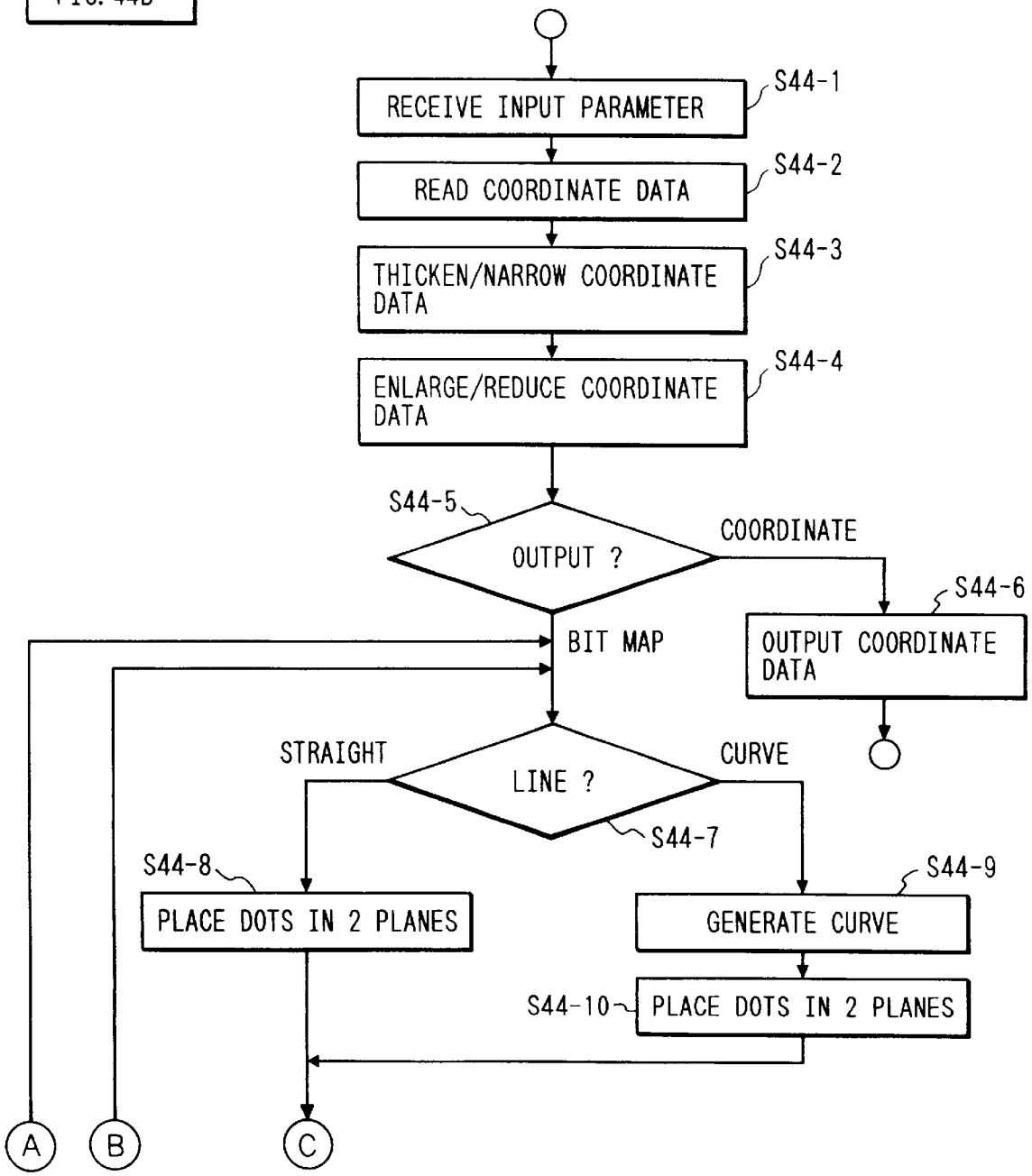

CHARACTER PROCESSING APPARATUS AND A CHARACTER PROCESSING METHOD

BACKGROUND OF THE INVENTION

1. Field of the Invention

The present invention relates to a character processing apparatus that changes the thickness of a coded character by using coordinate data for an outline, and to a method therefor.

2. Related Background Art

To develop stored coordinate data for an outline in a bit map to output a character, conventionally, coordinate data of an outline that is stored in a ROM or on a hard disk are read out, and the coordinate data are converted into a desired size by multiplying them by an enlargement/reduction rate. The resultant data are then employed to prepare a form composed of dots, and character data are thus acquired.

In this case, if weights (thicknesses or boldface values) of characters differ even though they are members of the same style, coordinate data is required for each character. For Japanese styles, however, 8,000 characters are required for each style, and the memory capacity for the outline data that are required for each style will range from 1M byte to 3M bytes. If coordinate data for of an outline is given for each weight, an enormously large memory capacity must be provided.

Therefore, from data in a single style, data in the same style that have different weights are calculated by employing a thickening amount or a narrowing amount that are obtained from three points: an object coordinate point and two adjacent points (see Japanese Patent Application Nos. 5-309555 and 5-309556, which were previously submitted by the present applicant).

In the above case, however, when a line that is to be transformed is one that is folded at an acute angle of, for example, 30 degrees, which is formed by the three points, an object point is positioned outside a character area, and the shape of a character is greatly degraded.

SUMMARY OF THE INVENTION

To overcome the above problems, it is one object of the present invention to generate, from data for at least a single style, data for high quality characters in the same style that have different weights (thicknesses), and to generate character data for various weights while employing a small memory capacity.

To achieve the above object, according to the present invention, character data that are formed from outline data are stored, a character pattern is generated by employing the outline data, a thickening amount or a narrowing amount is input to thicken or narrow the character pattern, a coordinate value for the outline data that are stored is transformed based on the thickening amount or the narrowing amount that is input, a shape of an outline is determined when a transformation is performed, coordinates that are to be transformed are adjusted based on a determination result, and outline data that are obtained as a result of the transformation, the determination, and an adjustment of the coordinates are employed to generate a thick or narrow character pattern.

According to the present invention, a plurality of sets of character data with different thicknesses, in which a single character is formed of a plurality of outline data, are stored; a character pattern with a different thickening amount is generated based on the outline data that are stored; a thickening amount or a narrowing amount is input to thicken or narrow the character pattern; the thickening amount or the narrowing amount that is input is employed to select character data that are to be transformed; a coordinate value of the outline data that correspond to the selected character data is transformed; a shape of the outline is determined before transformation; according to a determination result, coordinate adjustment is performed to change a result of a transformation; and outline data that are obtained by the transformation, the determination and the coordinate adjustment are employed to generate a thick or a narrow character pattern.

At the selection, data for a character whose thickness is close to the thickening amount or the narrowing amount that is input can be selected as character data that are to be transformed.

At the transformation, one transformed coordinate set can be determined by referring to coordinate values at two points that are adjacent to object coordinates.

At the input, a parameter for the thickening amount or for the narrowing amount can be input in an x direction and in a y direction, and at the transformation, the thickening amount and the narrowing amount may be independently changed in the x direction and in the y direction.

At the determination, while the object coordinates of two points that are adjacent to the object coordinates are referred to, a thickening amount or a narrowing amount may be determined by an angle that is formed by the three points and an input value, and a shape of an outline may be determined by an object style.

At the coordinate adjustment, coordinates may be acquired by inserting two new points instead of by using the coordinate value that is acquired by the transformation.

At the coordinate adjustment, coordinates may be acquired by inserting two new points that form a curve, instead of by using the coordinate value that is acquired by the transformation.

The coordinate adjustment may be performed by shifting the coordinate value that is acquired by the transformation.

According to the present invention, the transformation is performed by varying extracted outline data independently in the x direction and y direction according to the thickening amount or the narrowing amount that is input. A boldface or lightface character pattern on which the characteristic of each style is reflected is generated.

According to the present invention, the object coordinates and the coordinate values of two adjacent points are referred to, and the shape of an outline is determined by examining whether or not an angle formed by the three points and an input value indicate the thickening amount or the narrowing amount, and by an object style. Therefore, a boldface or lightface character pattern of high quality is produced.

According to the present invention, since the coordinate adjustment is performed by inserting a new point as an object point when the thickening amount is selected, a boldface character pattern of high quality is produced.

According to the present invention, since the coordinate adjustment is performed by inserting a new point as an object point when the thickening amount is designated, and by rounding the corner edges, a preferable boldface character pattern that reflects the characteristic for each style is produced.

According to the present invention, if the coordinate adjustment is performed by moving an object point when the narrowing amount is designated, a lightface character pattern of high quality is produced.

According to the present invention, for data generation, either a bit mapped font, outline data, or a gray scale font is output in consonance with transformed outline data, and boldface or lightface character data is transmitted in an appropriate data format to various output means.

The outline data may be constituted by a plurality of outline data that have crossing strokes, or by a plurality of outline data that have no crossing strokes.

At the preparation of the character data, a bit mapped font or a gray scale font may be output.

At the preparation of the character data, outline data may also be output.

The outline data may be constituted by a plurality of outline data that have crossing strokes.

The outline data may be constituted by a plurality of outline data that have no crossing strokes.

In the present invention, based on an input thickening amount or a narrowing amount, a coordinate value for outline data is converted, a coordinate value that is to be adjusted is extracted and adjusted, and the adjusted outline data are employed to generate a thick or narrow character pattern. A boldface or lightface of high quality with different thicknesses can be provided with a small amount of character data.

In the present invention, character data that are to be changed is determined in consonance with the input thickening amount or narrowing amount, the coordinate value of the outline data that correspond to the determined character data is transformed, and the outline data whose coordinates have been transformed are employed to provide a thick or narrow character pattern. The character data sources are utilized to provide the best boldface or lightface character data.

In the present invention, data for a character whose thickness is close to the input thickening amount or the narrowing amount is determined as character data that are to be transformed, so that more accurate boldface or lightface character data are produced.

In addition, in the present invention, the coordinate values of two points, which are adjacent to an object coordinate, are referred to in order to determine one set of transformed coordinates. A well-balanced boldface or lightface character pattern is provided.

BRIEF DESCRIPTION OF THE DRAWINGS

FIG. 4 is a diagram for explaining an outline font by using strokes according to the present invention;

FIG. 5 is a diagram showing a format for outline coordinate data by using stokes;

FIGS. 20A and 20B are tables that are employed for determining a thickening parameter;

FIGS. 23A to 23C are basic conceptual diagrams for changing a style to a gray scale font;

FIG. 28 is a diagram showing a coordinate data format by using an outline with no crossing strokes;

FIG. 38 is a table that is employed to determine a thickening parameter;

FIG. 40 is a flowchart showing the processing for determining an interior outline and an exterior outline;

FIGS. 43A and 43B are tables that are employed to determine a thickening parameter.

DETAILED DESCRIPTION OF THE PREFERRED EMBODIMENTS

The preferred embodiments of the present invention will now be described while referring to the accompanying drawings.

Figure 1:
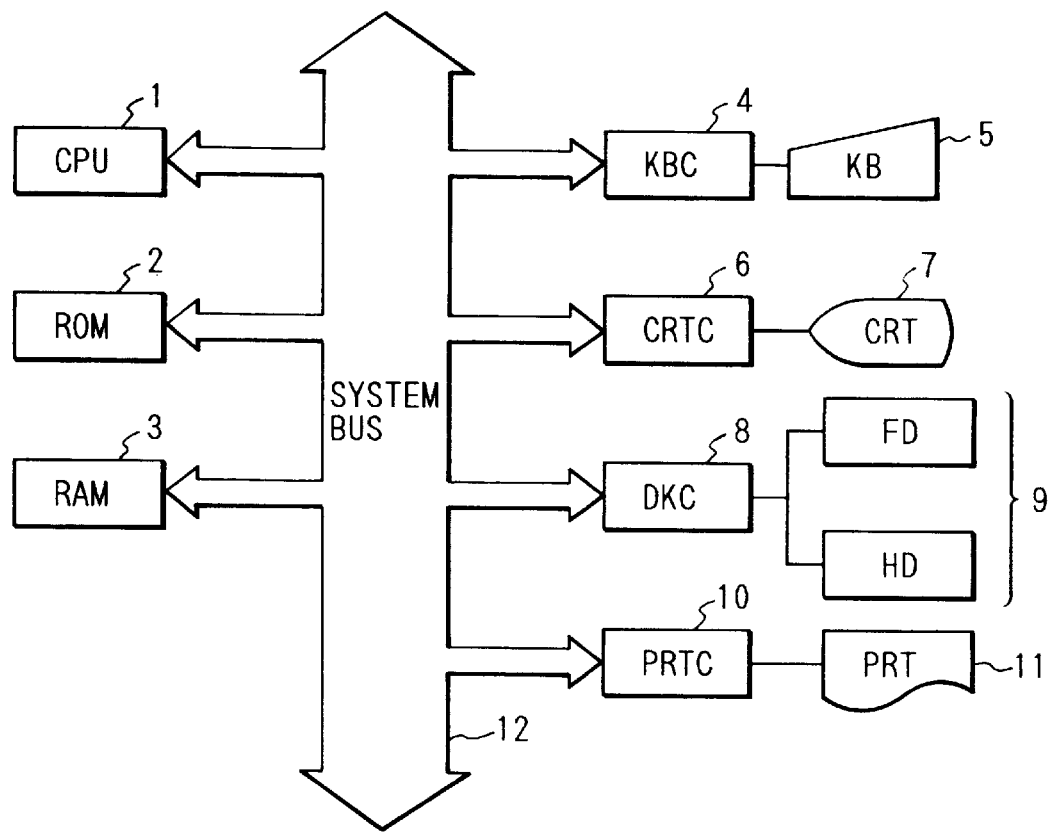
FIG. 1 is a block diagram illustrating an internal arrangement of the present invention.

FIG. 1 is a block diagram illustrating the basic arrangement of a system that is employed for the present invention. A system that is employed for the present invention may be a Japanese word processor or may be either a work station or a computer system.

In FIG. 1, a CPU (Central Processing Unit) 1 controls the entire apparatus and performs computations. A ROM (Read Only Memory) 2 is a storage area for a system activation program, character pattern data, etc. A RAM (Random Access Memory) 3 is a data storage area, which has no employment limitations, in which various program and data are stored for every process and are thereafter executed. A KBC (Keyboard Controller) 4 receives key input data from a KB (Keyboard) 5 and transmits it to the CPU 1. A CRTC 6 is a display controller, and a CRT 7, which is a display device, receives data from the CRTC 6. External storage devices 9, such as an FD (Floppy Disk) and an HD (Hard Disk), are employed to store programs and data, which are referred to or are loaded into the RAM as needed. A DKC (Disk Controller) 8 controls data transfer. A PRTC 10 is a printer controller and a PRT 11 is a printer. A system bus 12 serves as a data path between the above described components.

Figure 2:
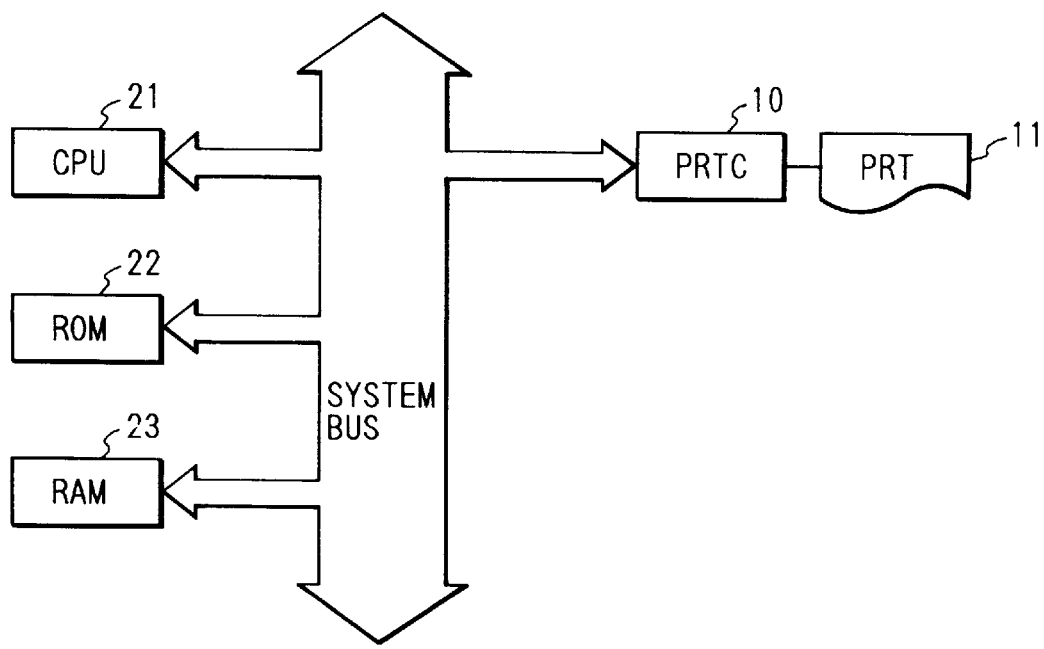
FIG. 2 is a block diagram illustrating another internal arrangement of the present invention.

FIG. 2 is also a block diagram illustrating the basic arrangement of a system according to the present invention. The system may include a laser beam printer that receives print data (image data, character codes, commands, etc.) from a host computer (not shown) and performs printing, or may include an ink-jet printer or a thermal transfer output machine. In FIG. 2, a CPU (Central Processing Unit) 21 controls the entire apparatus and performs computations. A ROM (Read Only Memory) 22 is a storage area for a system activation program, character pattern data, etc. A RAM (Random Access Memory) 23 is a data storage area, which has no employment limitations, wherein various programs and data for each process are stored and performed. A PRTC 10 is an output controller, and a PRT 11 is a printer that receives data from the PRTC 10 and prints the data.

[First Embodiment]

Figure 3B:
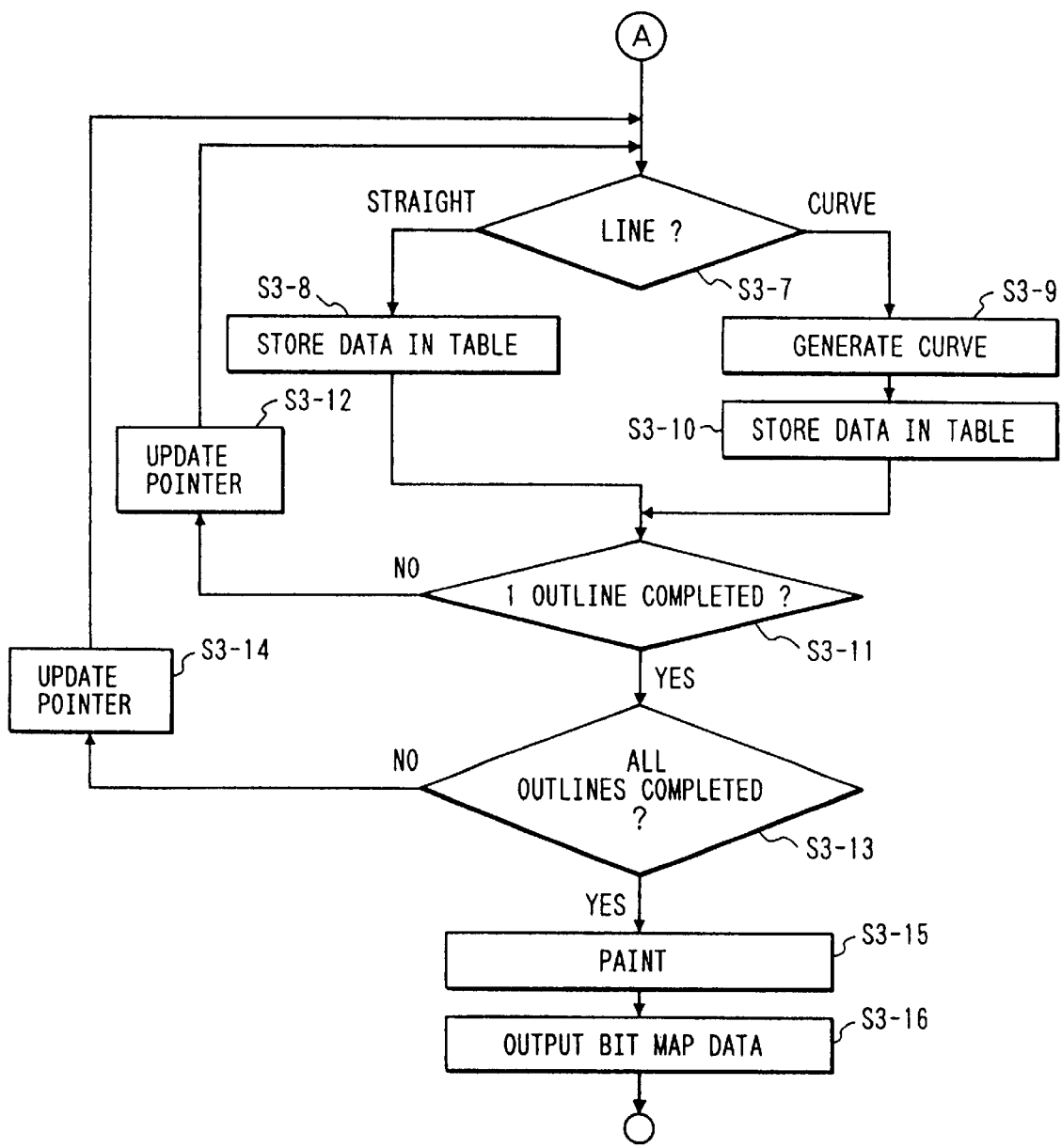
FIG. 3 is comprised of FIGS. 3A and 3B illustrating flowcharts showing the processing for an outline font by using strokes according to the present invention.

The details of one embodiment of the present invention will now be described while referring to the flowchart in FIGS. 3A and 3B. In FIGS. 3A and 3B are shown the general processing when character data are represented by coordinate data of outline segments that consist of strokes that form a character. The outline that is formed with these strokes is an outline wherein the strokes cross each other. In an example that is to be explained here, when there is one identical style with different weights (thicknesses) in the system, data for different weights are generated by using that data.

At step 3-1, an input parameter is received by an application program that is executed by the system shown in FIG. 1, or by a host computer (not shown) that supplies data to the system shown in FIG. 2. The input parameter is a character code, a style, a weight, an output size, an output form, etc., for a character that is to be output. The character code that is employed is determined by specifying which character code system will be used as an object system: JIS code, shift JIS code, EUC code, or UNI code. The style is selected from the data for the styles mincho, gothic, round gothic, etc., that are incorporated in the system in advance, or data that are added as options. The weight is information concerning the thickness of a line in the style, and in this embodiment, information for ultra fine, fine, medium, bold, and ultra bold is given. The character output size is information about the size in which the font data is actually to be output. The output form is an output data form for a desired font, and requests for the output of outline coordinate data and a bit map are generated.

At step 3-2, the coordinate data for an object character is read. This data is stored in advance in the ROM or the RAM, or on the hard disk or the floppy disk. The style information and the character code information that is acquired at step 3-1 are employed to search for the above coordinate data and to read it in the required amount. The fetched input information at this time is coordinate information from which characteristic points for the outline of a character are extracted, as is shown in FIG. 4. For each point is provided attribute information, such as a flag for determining linear line data/curve data and an outline start point/end point flag. Although the expression for interpolating curve data may be the second or the second B spline curve, or the second or the third Bezier curve, an interpolation expression to be employed is chosen in advance. The minimum value of coordinates that indicates a character frame is represented by 0 and the maximum value is represented by 800. Further, there is offset information from the origin of a character to a reference point along the frame of each stroke. The coordinate data is stored in the ROM, etc., in the format shown in FIG. 5.

Figure 6:
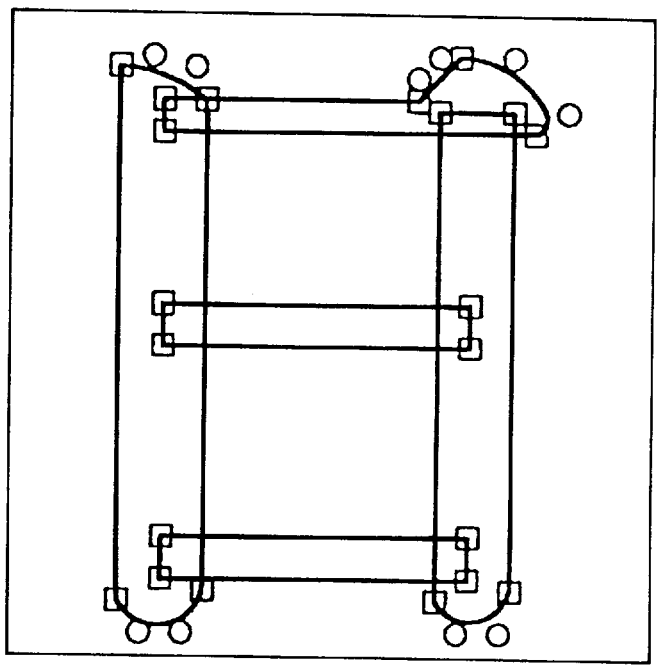
FIG. 6 is a diagram illustrating an outline font that is transformed according to the present invention.

At step 3-3, a thickening/narrowing process is performed on the acquired coordinate data in consonance with the weight information for the input parameter. This process will be described in detail later while referring to the flowcharts in FIGS. 10A and 10B. As the results are obtained through the thickening/narrowing process, the coordinates for the outline segments are transformed into thickening/narrowing coordinates. In FIG. 6 is shown a character that is provided by transforming the coordinates for the font in FIG. 4 into the coordinates for thickening. The coordinate points before the thickening/narrowing process was performed and those that were performed after that process correspond to each other, respectively, and the attribute flag for each point does not change. At step 3-4, an enlargement/reduction process is performed for coordinate data, which are obtained by thickening/narrowing at step 3-3, that are in consonance with the output size of the input parameter. Supposing that a requested output size is (Ax, Ay), each coordinate value that is acquired at step 3-3 is (x, y), each coordinate value that is acquired after the enlargement/reduction process is performed is (X, Y), and the stored size of a character frame is (Mx, My), with the coordinate value (X, Y) being represented by equation 1:

$$(X, Y)=(x \times Ax/Mx, y \times Ay/My) \tag{1}$$

All the rows of coordinates that a single character has are calculated by using the above expression. The attribute flag at each coordinate point that is obtained at step 3-3 is not changed.

At step 3-5, the output form of the input parameter is examined. If the output form is the outline coordinate data output, program control advances to step 3-6, whereat the coordinate points, which are obtained by the enlargement or reduction process at step 3-4, and data rows of coordinate point attributes are returned to the request side. The format of the outline coordinate data that are output is the same as that in FIG. 5.

If, at step 3-5, a bit map output is requested, program control moves to step 3-7. At the procedures at steps 3-7 through 3-13, data for a bit map is actually prepared from the coordinate data. At step 3-7, a check is performed to determine whether or not the object coordinate data is data for a straight line or for a curved line. If the object coordinate data is data for a straight line, the coordinate point of the data is assumed to be a start point for the straight line and the succeeding coordinate point is assumed to be an end point for the straight line. Program control then moves to step 3-8. When the object data is data for a curved line, an interval that extends from the coordinate point to the coordinate data point, for which the curved line end flag is provided, is assumed to be curved line data. Program control then moves to step 3-9.

Figure 7:
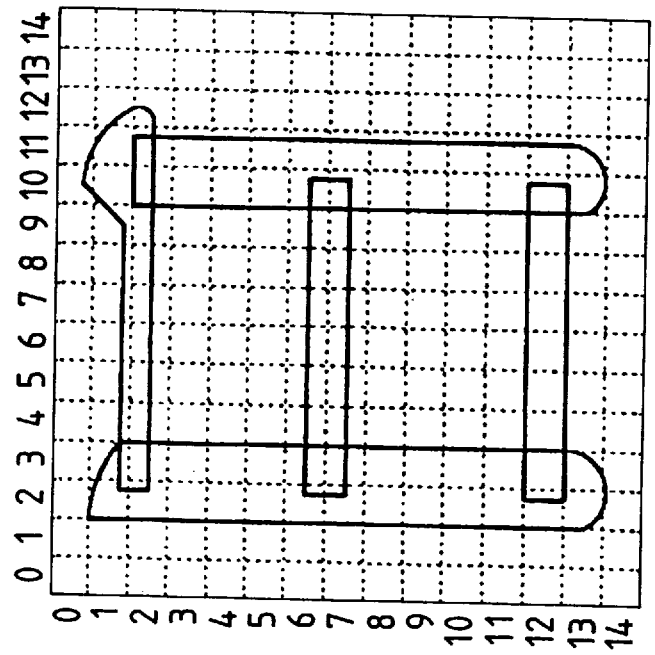
FIG. 7 is a diagram showing how a painting table is prepared from coordinate data.

At step 3-8, a process for generating a curve is performed. A DDA (Digital Differential Algorithm) is employed as a line generation method. The coordinate data that are acquired by the DDA are stored in a point table, as is shown in FIG. 7. In the point table in FIG. 7, a start coordinate and a stop coordinate for an x coordinate are entered for each y coordinate in the output area. When, as the result of employing the DDA, a plurality of x coordinates exist for a single y coordinate, the x coordinates are so set that they are located at an outermost position relative to the outline of the stroke. Painting data using curve data are also entered in the point table in FIG. 7.

Figure 8:
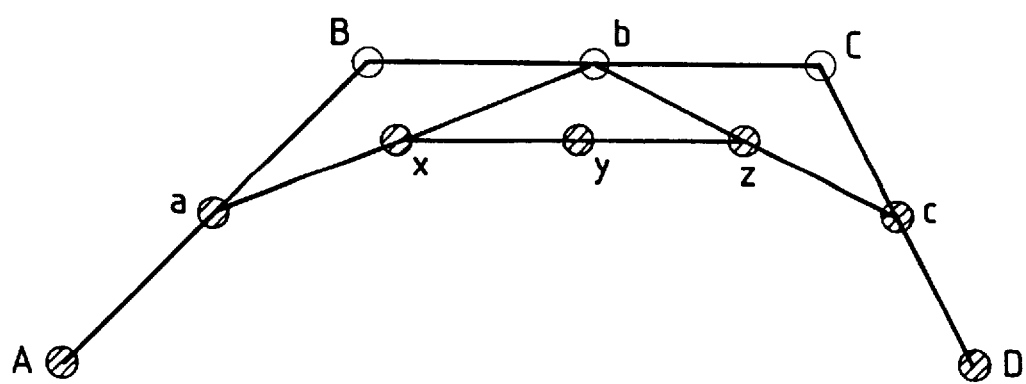
FIG. 8 is a diagram showing how the third Bezier curve is analyzed.

At step 3-9, the curve data are converted into a set of short lines (short vectors). In FIG. 8 is shown the conversion of the third Bezier curve into a set of short vectors. Points A, B, C and D are curve data (the third Bezier curve forming points) that are obtained after the coordinate transformation at step 3-3. Middle points a, b, and c of the lines that connect points A through D are calculated. The point a is the middle point between points A and B, the point b is the middle point between points B and C, and the point c is the middle point between points C and D. Then, points x, y, and z are calculated. Further, the middle point of a line that connects the points a through c is calculated. The point x is the middle point between points a and c, the point z is the middle point between the points b and c, and the point y is the middle point between points x and z. Then, point row Aaxy serves as a new third Bezier curve point row, and point row yzcD serves as a new third Bezier curve point row. These Bezier curve point rows are divided minutely in the above described manner, and when they satisfy a specific determination standard, the division is halted. The third Bezier curve point row that is acquired through this process is a set of short vectors.

At step 3-10, the set of short vectors that is obtained at step 3-9 is stored in the point table. The entry method in the table is the same as that at step 3-8, and the process is repeated until the last short vector is entered. At step 3-11, a check is performed to determine whether or not the acquisition of the coordinate data for a single outline has been completed. When the acquisition process has been completed for all the coordinate data, program control advances to step 3-13. When the acquisition process is not terminated, program control moves to step 3-12. At step 3-12, a pointer for current coordinate data is updated to point to process succeeding data. If the coordinate data is straight line data, the pointer is updated to point to succeeding coordinate data. When the coordinate data is curved line data, the pointer is updated to point to the curved line end coordinate point. Program control thereafter returns to step 3-7, whereat a check is performed to determine whether or not the coordinate data is straight line data or curved line data in order to set points. At step 3-13, a check is performed to determine whether or not all the coordinate data for a single character have been processed. When the process has been completed for the entire outline, program control goes to step 3-15. When the process has not been completed, program control goes to step 3-14. At step 3-14, since the process for one outline has been completed, the pointer is updated to point to the head of a succeeding outline, and program control returns to step 3-7. Through this process, the point table in FIG. 7 is finally completed.

Figure 9:
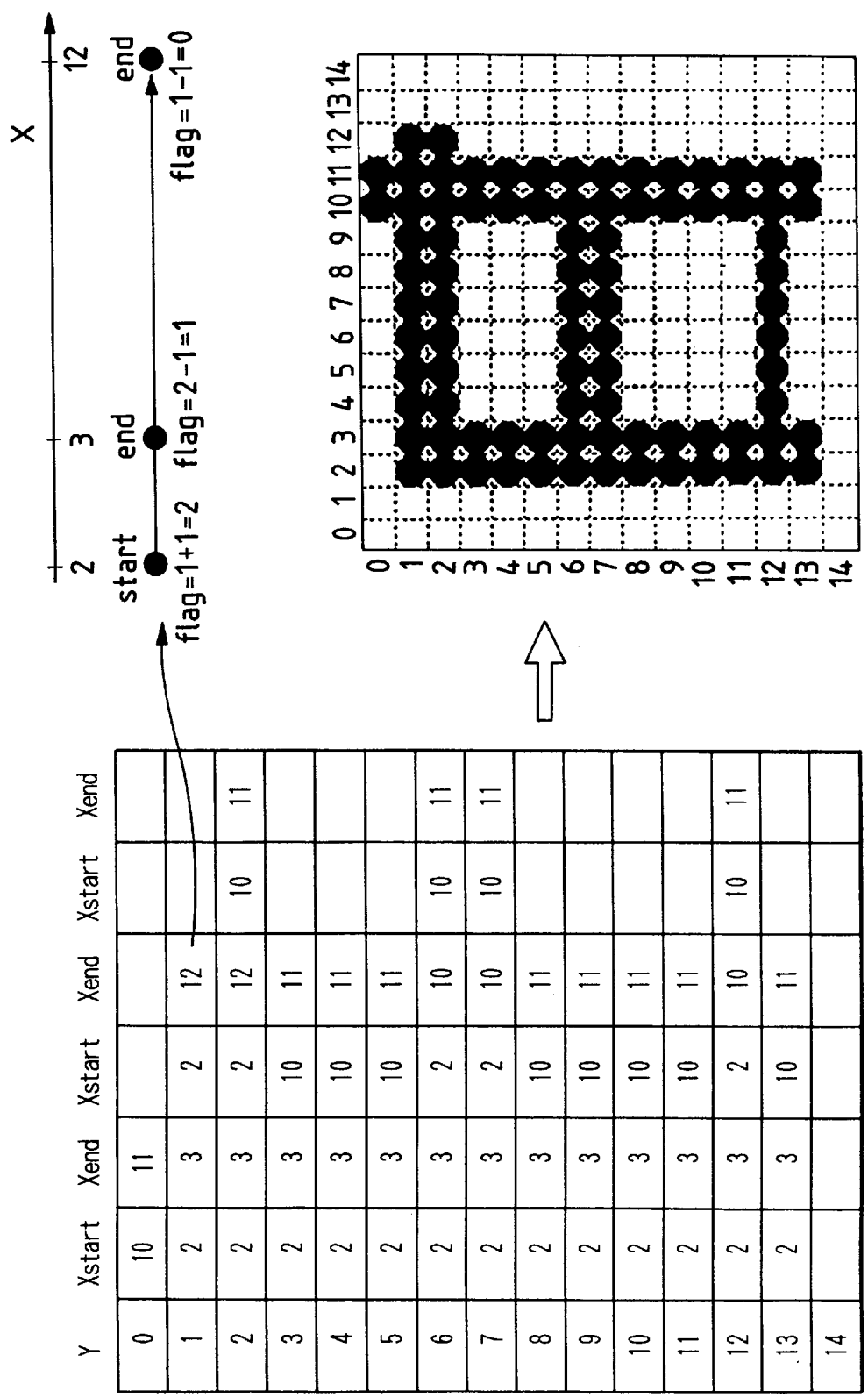
FIG. 9 is a diagram showing how a bit mapped font is prepared from a painting table.

Since the setting of points is completed for all the coordinate data, at step 3-15 a non-zero winding method is employed to perform painting for each x coordinate that corresponds to each y coordinate that is stored in the point table at steps 3-8 and 3-10, as is shown in FIG. 9. According to this method, each scan line is scanned from the left side, and if the point is a start point, a value that is set at the flag is incremented. If the point is an end point, the value that is set at the flag is decremented. When the value that is set at the flag is not 0, that value is set to 1 during this process, and painting is performed. At step 3-16, data that are obtained at step 3-15 for a single character are returned to an area that is designated by the request side, and the processing is thereafter terminated. When the request side is the PRTC 10, the data are returned to the PRTC 10, and the data are printed by the PRT 11. When the request side is the CRTC 6, the data are returned to the CRTC 6 and the data are displayed on the CRT 7.

Figure 10B:
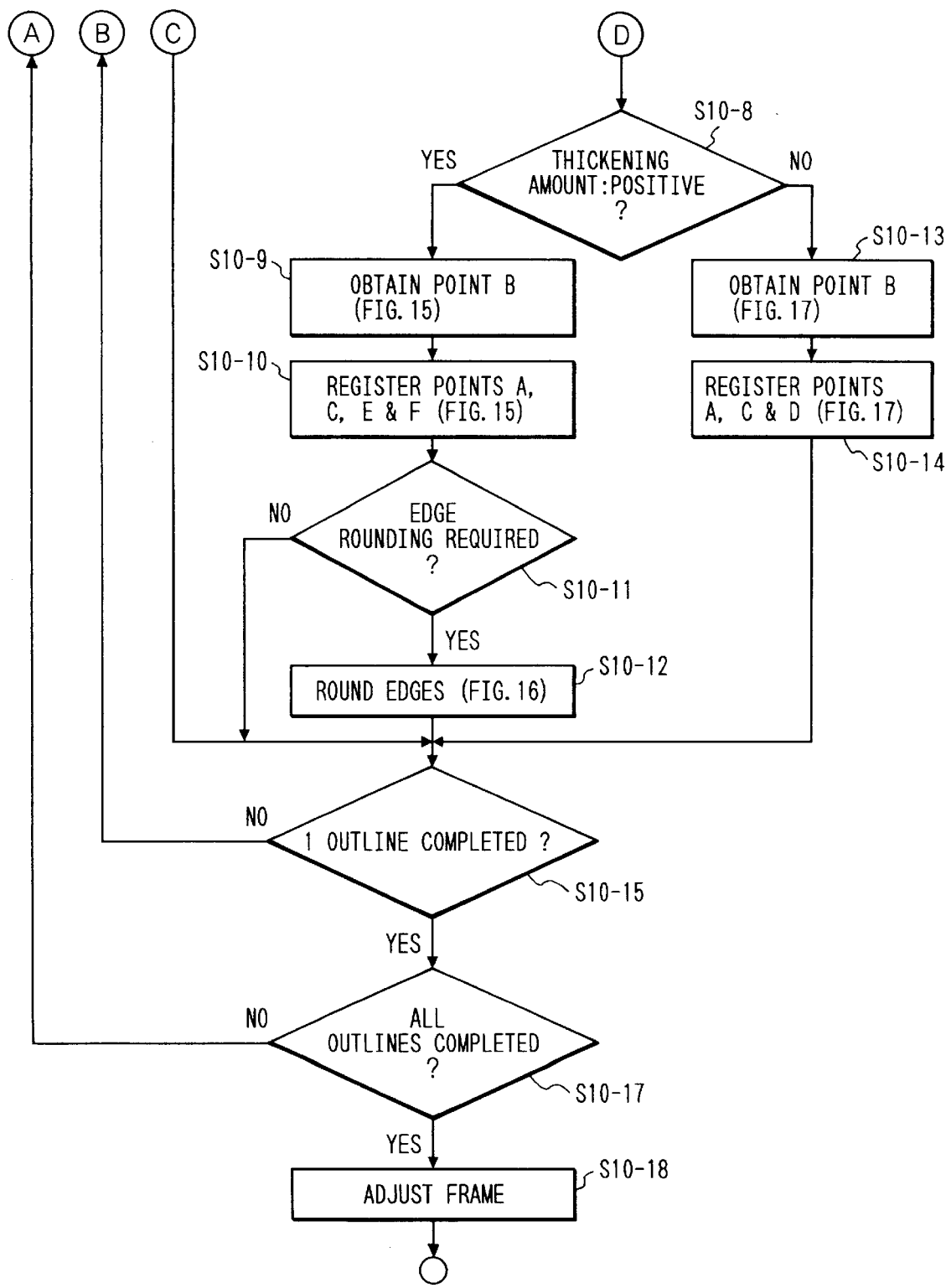
FIG. 10 is comprised of FIGS. 10A and 10B illustrating detailed flowcharts showing the thickening process.
Figure 11A:
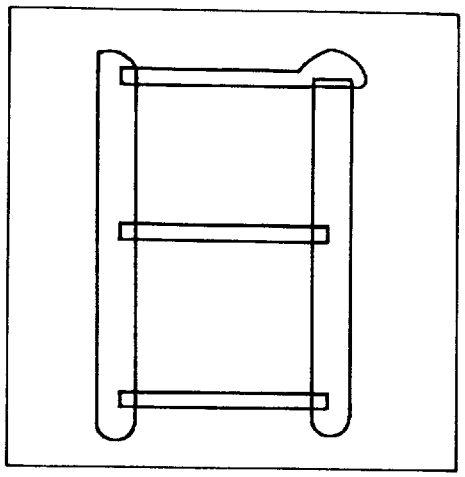
FIGS. 11A and 11B are diagrams illustrating the processing for thickening a character in the mincho style.
Figure 11B:
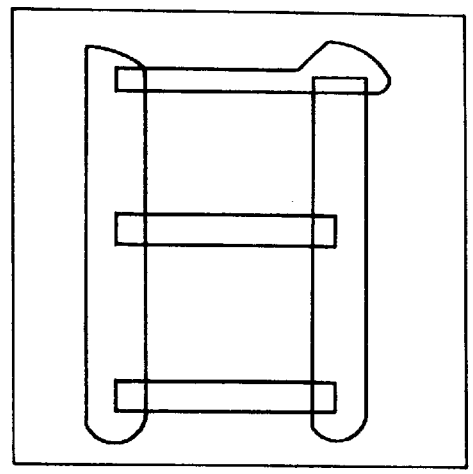
Figure 12A:
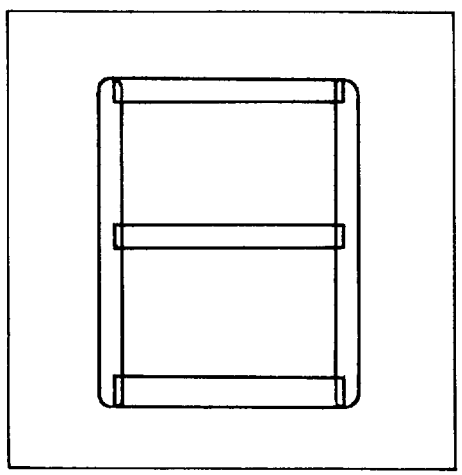
FIGS. 12A and 12B are diagrams illustrating the processing for thickening a character in the bold round gothic style.
Figure 12B:
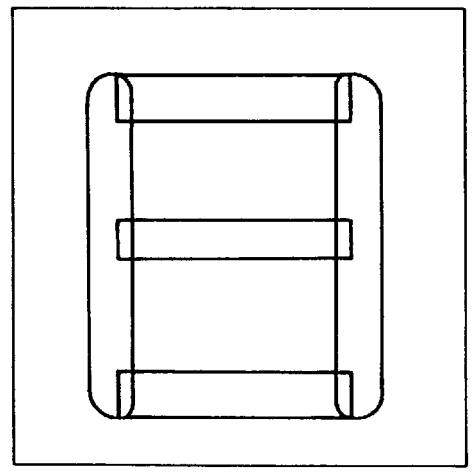
Figures 13, 14:
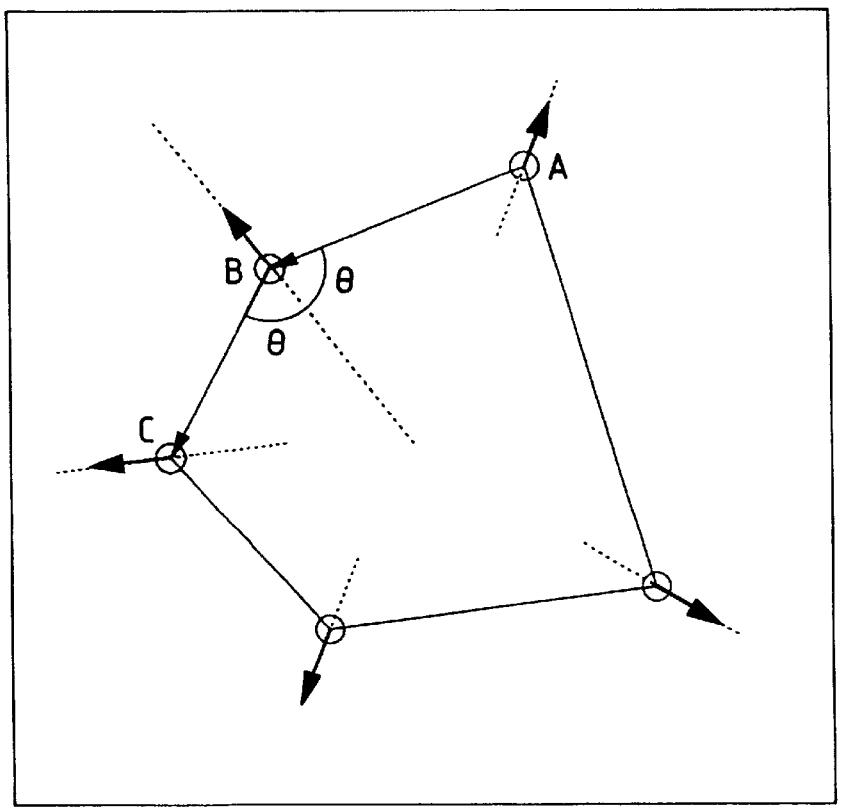
FIG. 13 is a table that is employed to determine a thickening parameter.
FIG. 14 is a diagram for the thickening process.

The thickening/narrowing process at step 3-3 in this embodiment will be described in detail while referring to the flowchart in FIGS. 10A and 10B. In the thickening/narrowing process according to the present invention, a parameter is changed by thickening or narrowing a stroke to alter the coordinates at the outline points. At step 10-1, a parameter for the thickness of the outline is determined in consonance with the weight. The parameter for determining the thickness has independent values in the X direction and in the y direction relative to the outline, and separately manages the thickening amount for a horizontal line and the thickening amount for a vertical line. In the thickening for the mincho style, for example, a horizontal line in the mincho style need not be thickened much, while a vertical line must be thickened very much, so that different values must be set for the x direction and for the y direction. This is apparent when a comparison is made of the medium mincho style in FIG. 11A with the bold mincho style in FIG. 11B. The round gothic style in FIG. 12A and the bold round gothic style in FIG. 12B must be thickened by the same amount in the horizontal and the vertical directions. Therefore, the thickening values for each of these styles must be changed. As is shown in FIG. 13, for the horizontal lines and the vertical lines of individual styles with individual weights, data for a reference value that is measured from the center line of each vertical line and of each horizontal line to a corresponding edge of the character outline are entered in a table in advance. The style and weight of object coordinate data that are input and the weight of coordinate data that are to be output are employed to determine the thickening amount for the character outline in the x direction and in the y direction. At this time, when the thickening amount is a positive value, the thickening process is performed. When the thickening amount is a negative value, the narrowing process is performed.

At step 10-2, offset information for each stroke is changed in consonance with the thickness parameter. This value is acquired by subtracting the x value and y value of the thickness parameter from the x coordinate and y coordinate of the offset information.

At the procedures at steps 10-3 through 10-14, the thickening/narrowing process is performed for all the coordinate point rows that form a single outline. At step 10-3, object points to be processed are acquired. At step 10-4, points that are adjacent to each of the object points are fetched. At step 10-5, an angle that is formed by the object point and the adjacent points is calculated. The following expression is employed for this calculation. Supposing that the object point is point a, the adjacent points are points b and c, and the angle that is formed by vector ab and vector ac is θ, $$\cos\theta = \frac{\vec{ab} \cdot \vec{ac}}{|\vec{ab}| \times |\vec{ac}|}$$

Thus, θ can be acquired. Program control advances to step 10-6, and the movement of a point is changed in consonance with the angle for θ. When this angle is not a sharp angle (e.g., the value for θ of equal to or greater than 30), program control moves to step 10-7. When the angle is a sharp angle (e.g., the value for θ of less than 30), program control goes to step 10-8.

At step 10-7, the thickening process for an angle θ that is not a sharp angle is performed. This process will be explained while referring to FIG. 14. Suppose that an object point is B, an immediately preceding point is A, and an immediately succeeding point is C. The point B is moved toward the outside of the outline in a direction in which an angle that is formed with vector AB and vector BC is divided into two equal parts. The shifting value is thus determined to be the hypotenuse for the x thickening amount and the y thickening amount that are obtained at step 10-1. Since the coordinate value that is acquired at this time is a coordinate value for one stroke frame, the offset coordinate value that is acquired at step 10-2 is added to this, and the resultant value is employed as a coordinate value from the origin of a character.

The thickening process for a very sharp angle θ at steps 10-8 through 10-14 (the value for θ is less than 30) will now be explained. The process, however, must be changed depending on whether or the thickening amount is positive or negative. At step 10-8, a check is performed to determine whether or not the thickening amount is a positive value or a negative value. When the thickening amount is positive, program control advances to step 10-9. When the thickening amount is negative, program control moves to step 10-13.

Figure 15:
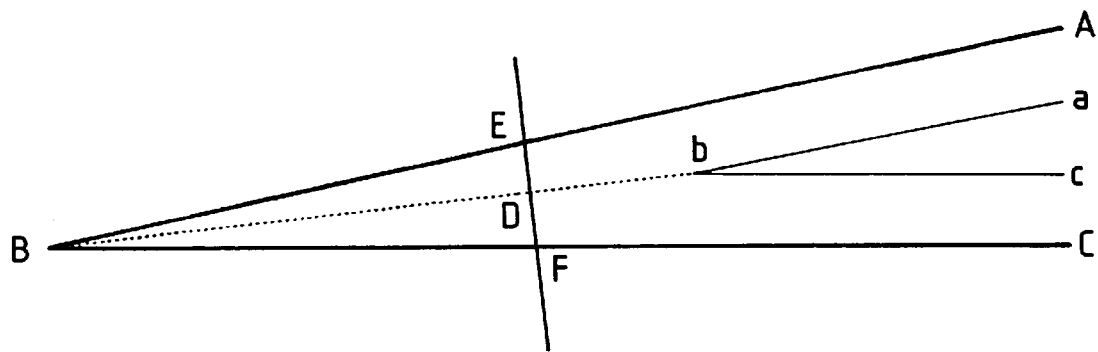
FIG. 15 is a diagram showing how a point is divided with a positive thickening amount and at an acute angle.

The processing for the positive thickening amount is performed at steps 10-9 through 10-12. At step 10-9, in the same manner as for the angle that is not as sharp, a shifting point B (see FIG. 15) for the thickening process is acquired. In FIG. 15, points a through c are points for the original outline, and points A through C are points for the resultant outline that is provided by simply thickening the original. Since the angle θ is a very sharp angle, the shifting point B extends very far outward from the original point, and sometimes moves out of a character area. To prevent this, two points are newly set intermediately, and the shifting point is moved so as not to be extremely far from the original point.

Figure 16:
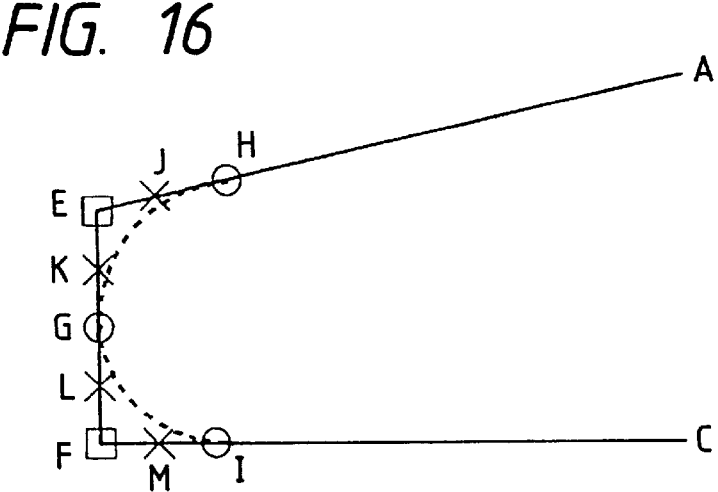
FIG. 16 is a diagram showing divided points being connected to form a round shape.

At step 10-10, calculation is performed to obtain the new two points. This process will be explained while referring to FIG. 15. In FIG. 15, three points (points a, b and c) on the original outline and three points (points A, B and C) on a corresponding outline, which is obtained by simply thickening the original, are employed to calculate a point D that is located at a distance that is twice the thickening amount in a direction that corresponds to the vector bB. The stroke is cut by a vector that is perpendicular to the vector bD, and the points that intersect the line segments AB and BC, which are acquired by simple thickening, are presumed to be points E and F. These two points, E and F, are registered as points that are obtained by newly performing a thickening process. The thus acquired coordinate points, A, E, F and C are registered as new outline points that are obtained by thickening. At step 10-11, a check is performed to determine whether or not an object style requires rounding of its corner edges, as does the round gothic style. If the rounding is not necessary, the points A, E, F and C are registered unchanged as the points that are obtained after the thickening is performed, and program control goes to step 10-15. If the style requires the rounding of the corner edges, program control advances to step 10-12, whereat the rounding of the corner edges is performed. At step 10-12, as is shown in FIG. 16, a new point, G, is set in the middle of line EF, point H is set on line segment EA and point I is set on line segment FC, so that line segments HE and FI are as long as either line segment EG or GF. Supposing that the middle points of the line segments HE, EG and GF are respectively points J, K, L and M, the point row H, J, K and G and the point row G, L, M and I can be represented as the point rows of the Bezier curve. The straight line point row A and H, the Bezier curve point row H, J, K and G, the Bezier curve point row G, L, M and I, and the straight line point row I and C are registered as point rows that form an outline that is obtained after a new thickening process for rounding the corner edges is performed. An explanation has been given for the process that is performed at steps 10-9 through 10-12 when the angle is small and the thickening amount is a positive value.

Figure 17:
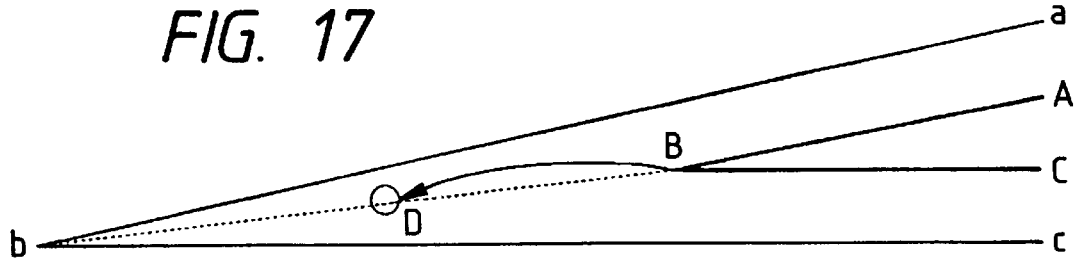
FIG. 17 is a diagram illustrating how an acute angle is handled when a thickening amount is negative.

The process at steps 10-13 and 10-14 for a negative thickening amount will now be described while referring to FIG. 17. The symbols that denote points in FIG. 17 have the same meaning as those in FIG. 15. At step 10-13, the shifting point B is acquired for the thickening process, in the same manner as for a less sharp angle. However, in this case, since the angle is very sharp, the shifting point is greatly extended from the original point and sometimes a line segment for a stroke is thus lost. To prevent this, among the shifting points A, B and C, for simple thickening, which are acquired by points a, b and c, the point B is so located as to be close to point b, and the characteristic of a stroke must be maintained. At step 10-14, calculation for setting the point B close to point b is performed. By this calculation, a point D is acquired that is located at a distance that is twice that of the thickening amount in the direction that corresponds to the vector bB. This point D is employed as a point for a new thickening process. In other words, the point D is registered as a new outline formation point when the points A, D and C form a sharp angle and the thickening amount is negative. An explanation has been given for processes for the positive thickening amount and for the negative thickening amount when the object points for thickening form a sharp angle.

The process at steps 10-3 through 10-14 is performed to all the points that form an outline. When, at step 10-15, all the coordinate values for one outline have been processed, program control moves to step 10-17. When the coordinate points of an outline to be processed still exist, program control goes to step 10-16, whereat the pointer is updated to a succeeding outline coordinate point, for which the thickening process is performed.

At step 10-17, a check is performed to determine whether or not all the outlines of a single character have been processed. When all the outlines have been processed, program control moves to step 10-18. When an outline to be processed still exists, the pointer is updated to a succeeding outline, for which the thickening process is performed. When the thickening process has been completed for all the outline coordinate points, program control advances to step 10-18.

Figure 18:
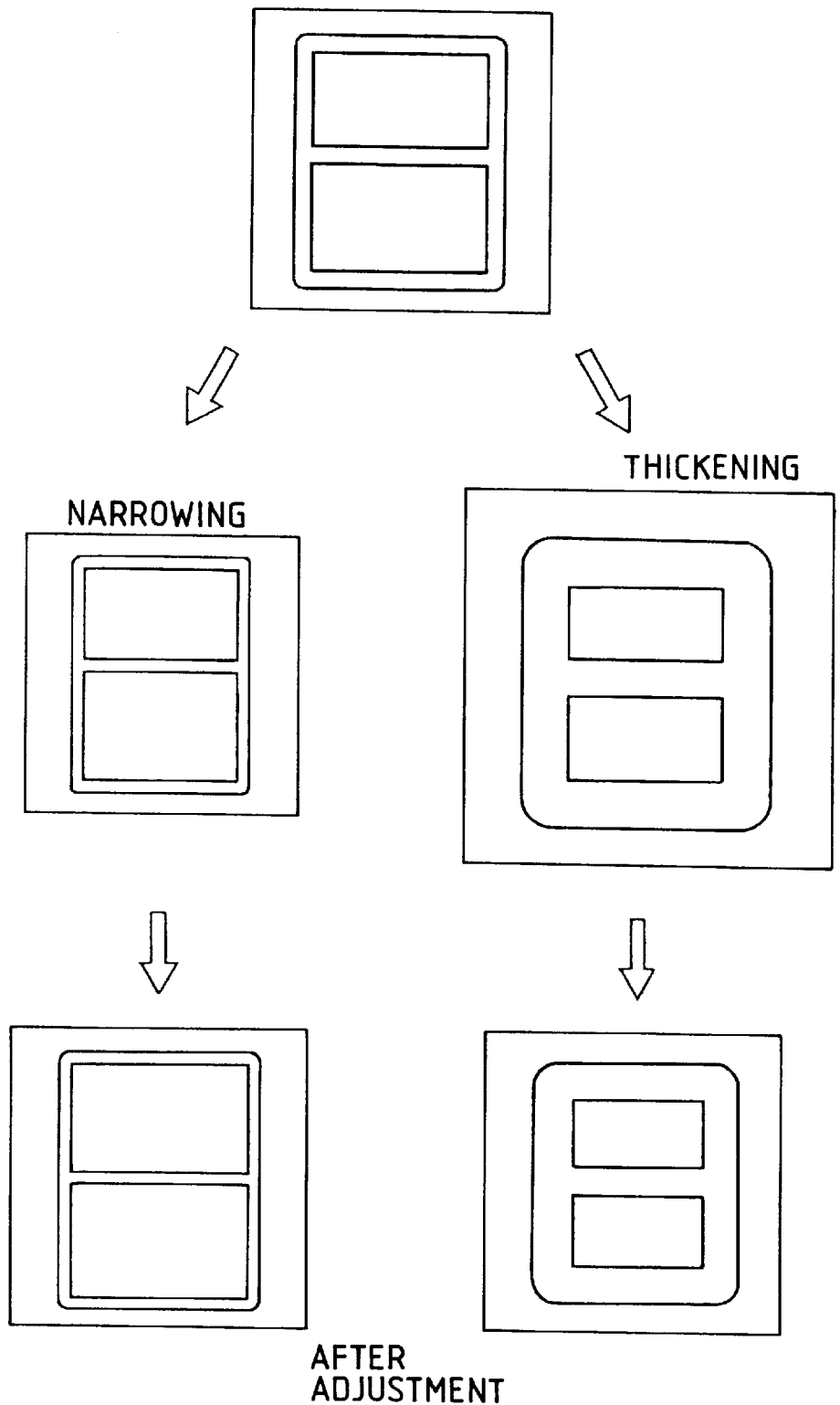
FIG. 18 is a diagram showing the state where a problem occurs by performing a thickening process.

As is shown in FIG. 18, the total area of a character frame is increased by performing the thickening process, while the total area is reduced by performing the narrowing process. Therefore, the entire frame must be adjusted to the original size. This adjustment is performed at step 10-18. The increase/reduction amount for the adjustment is twice the thickening amount (a negative thickening amount for the narrowing case) of an outline that is acquired at step 10-1. Supposing that the X width of the original character frame is Bx, the horizontal thickening amount of the outline is Fx, the Y width is By, the vertically thickening amount of the outline is Fy, the coordinates to be processed for thickening are (x, y), and the coordinates after the adjustment are (X, Y), the following expression is established:

$$(X, Y)=((x+Fx) \times Bx/(Bx+Fx \times 2), (y+Fy) \times By/(By+Fy \times 2)) \qquad (3)$$

This calculation is performed for all the coordinate points for a single character, and the thickening process in FIG. 10 is thereafter terminated.

[Second Embodiment]

Another embodiment will now be described by employing an example wherein, upon a request for a style with a specific weight, two or more identical styles exist in a system. It is important that the weight of a style be employed as a reference among a plurality of identical styles with different weights in order that a requested weight can be handled. Therefore, once a style with a weight that is employed as a reference is determined, a succeeding weight conversion process can be performed in the same manner as in the previous embodiment. Thus, only a method for selecting a weight that serves as a reference will be explained here, and the other processes will not be given.

Figure 19:
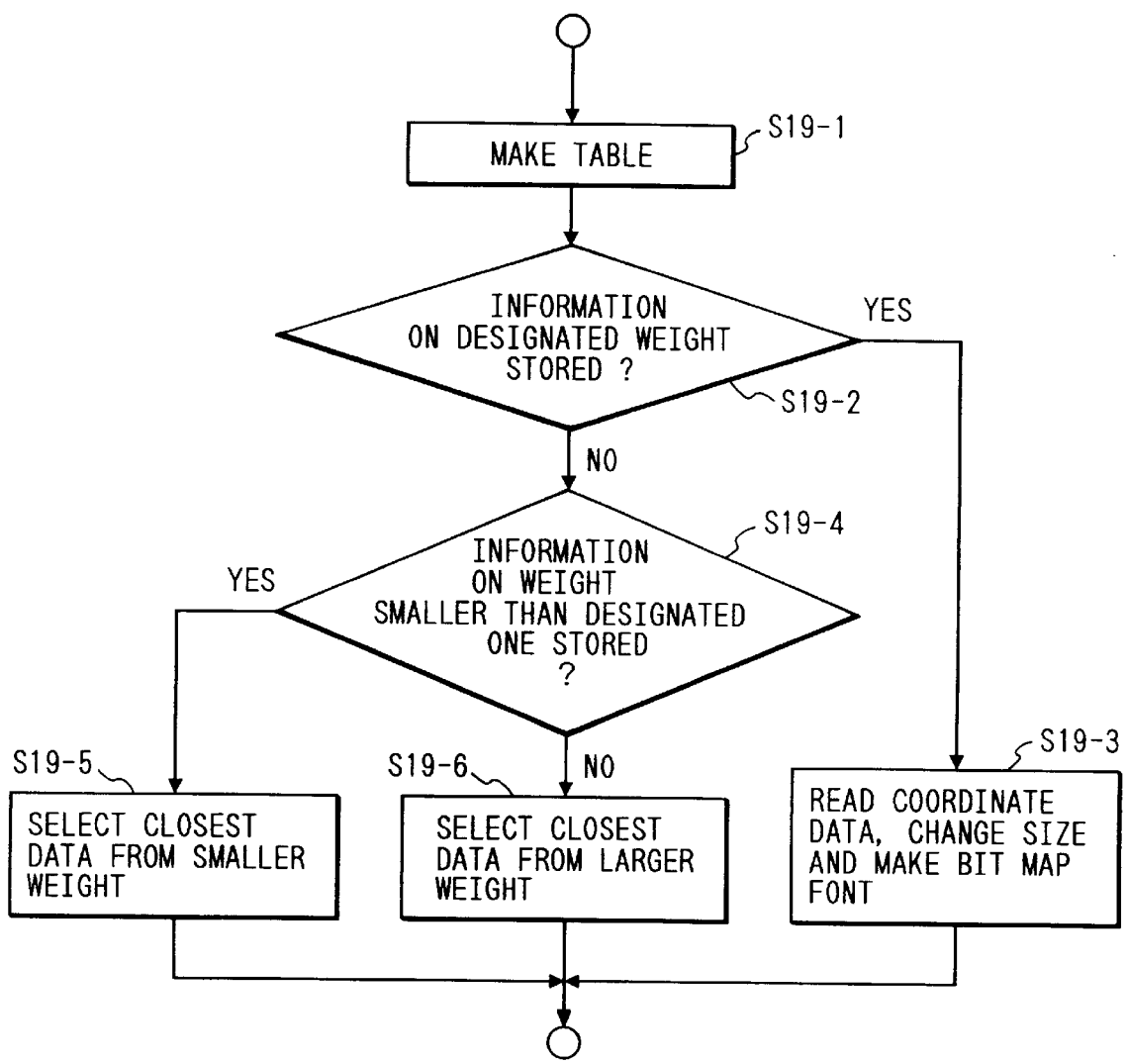
FIG. 19 is a flowchart showing the general processing for another embodiment of the present invention.

FIG. 19 is a detailed flowchart showing the processing for selecting a weight.

First, it is necessary to examine which weights of which styles are stored in the storage device. At step 19-1 in FIG. 19, header information that is stored in the header portion of each style is referred to and data presence information is entered in a table. In FIGS. 20A and 20B are shown a table and data presence information. In this embodiment, in a storage device are stored weight 3 and weight 7 for the mincho style, weight 5 for the round gothic style (see FIG. 20A), weight 6 for the angular gothic style, and weight 4 and weight 7 for the kaisho style (see FIG. 20B). At step 19-2, a check is performed to determine whether or not the information for a requested weight has been stored in a storage device, such as a ROM or a hard disk device. For this decision, the table that is prepared at step 19-1 is searched for information concerning the requested style and weight to determine whether or not the data are stored in the storage device. When the requested weight information is stored in the storage device, program control advances to step 19-3. When the information is not stored, program control moves to step 19-4.

At step 19-3, since the requested weight information is stored in the storage device, the thickening/narrowing process is not required. The coordinate data are read from the storage device. The increase or reduction process is performed for the coordinate data in consonance with the output size, and a bit mapped font is created. The process is thereafter terminated.

At step 19-4, since the requested weight information is not present in the storage device, the thickening/narrowing process should be performed to output a character with the requested weight. It is therefore necessary to select original data, for which the thickening/narrowing process is performed. Ordinarily, there is less degradation in quality when the thickening process is performed than when the narrowing process is performed. Therefore, the table that is prepared at step 19-1 is employed to determine whether or not information for a smaller weight than the requested weight is stored in the storage device. When the information for a smaller weight than the requested weight is stored in the storage device, program control advances to step 19-5. When the requested weight information is not stored in the storage device, program control moves to step 19-6. When weight 5 for the mincho style is to be output, for example, as weight 3 for the mincho style is present in the storage device, program control therefore moves to step 19-5. When weight 3 for the angular style is to be output, as there is no angular gothic style with a smaller weight, program control goes to step 19-6. At step 19-5, the style of a weight that is employed as the origin for the thickening process is selected, and parameters are set in the x direction and in the y direction for thickening. When the requested output is for the mincho style that has a weight 5, since there is a weight 3 mincho style, the differences between the x direction and the y direction weight 3 and weight 5 outlines are set as thickening parameters. At step 19-6, the style of a weight that is the original for the narrowing process is selected, and parameters for the x direction and the y direction are set for an outline with which the narrowing process is performed. When the requested output is for the angular gothic style that has a weight 3, since there is a weight 5 angular gothic style available, the differences between the x direction and the y direction weight 3 and weight 6 outlines are set as narrowing parameters.

When the thickening or narrowing parameters are set at steps 19-5 and 19-6 in the above described manner, the process as is explained in the first embodiment is performed, and a character of a desired weight is output. In this embodiment, an explanation has been given for a case whether or not there is data for a smaller weight for a style than the weight of an object character. However, a check may be performed to determine whether or not there is data for a greater weight for a style than the weight of an object character. In addition, data for a weight that is the closest to the weight of an object character may be selected to perform a weight conversion process with that data.

[Third Embodiment]

Figure 21:
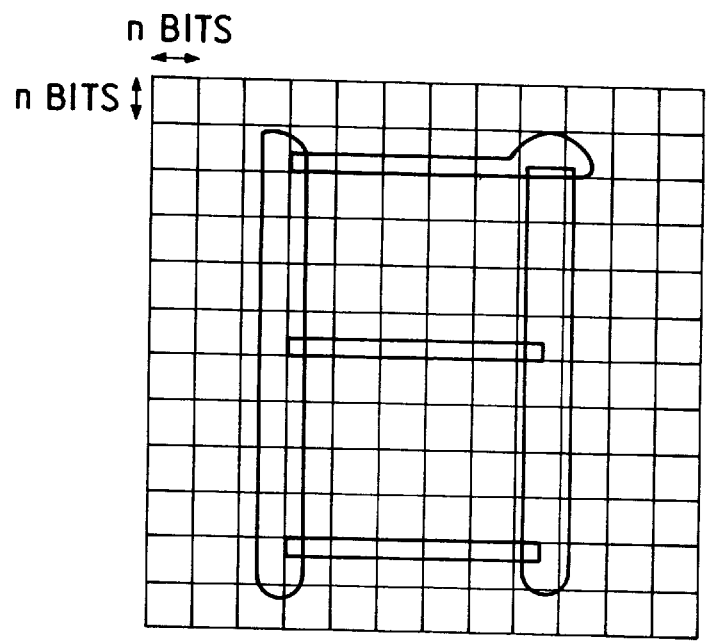
FIG. 21 is a diagram showing a bit map that is created to change a style into a gray scale font.

An additional embodiment of the present invention will now be described. According to this embodiment, the thickening process that is explained in the first and the second embodiments can be applied for a gray scale font. While the bit mapped font is a binary font wherein each dot value is 0 or 1, the gray scale font is a multi-value font that can handle multiple values, wherein each dot value is, for example, 0 to 3, 0 to 15, or 0 to 255. According to the method for generating such a gray scale font, when a gray font scale of n2 scales, as is shown in FIG. 21, is to be output, the requested output size is multiplied by n times vertically and horizontally at step 3-4 in FIG. 3, and the resultant output size is used to prepare a bit mapped font. Then, the map is divided by n bits vertically and horizontally, as is shown in FIG. 21, and a value that correspond to one dot of a gray scale font is determined by how many bits "1" are included in each square of the n×n divided rectangular area.

Figure 22B:
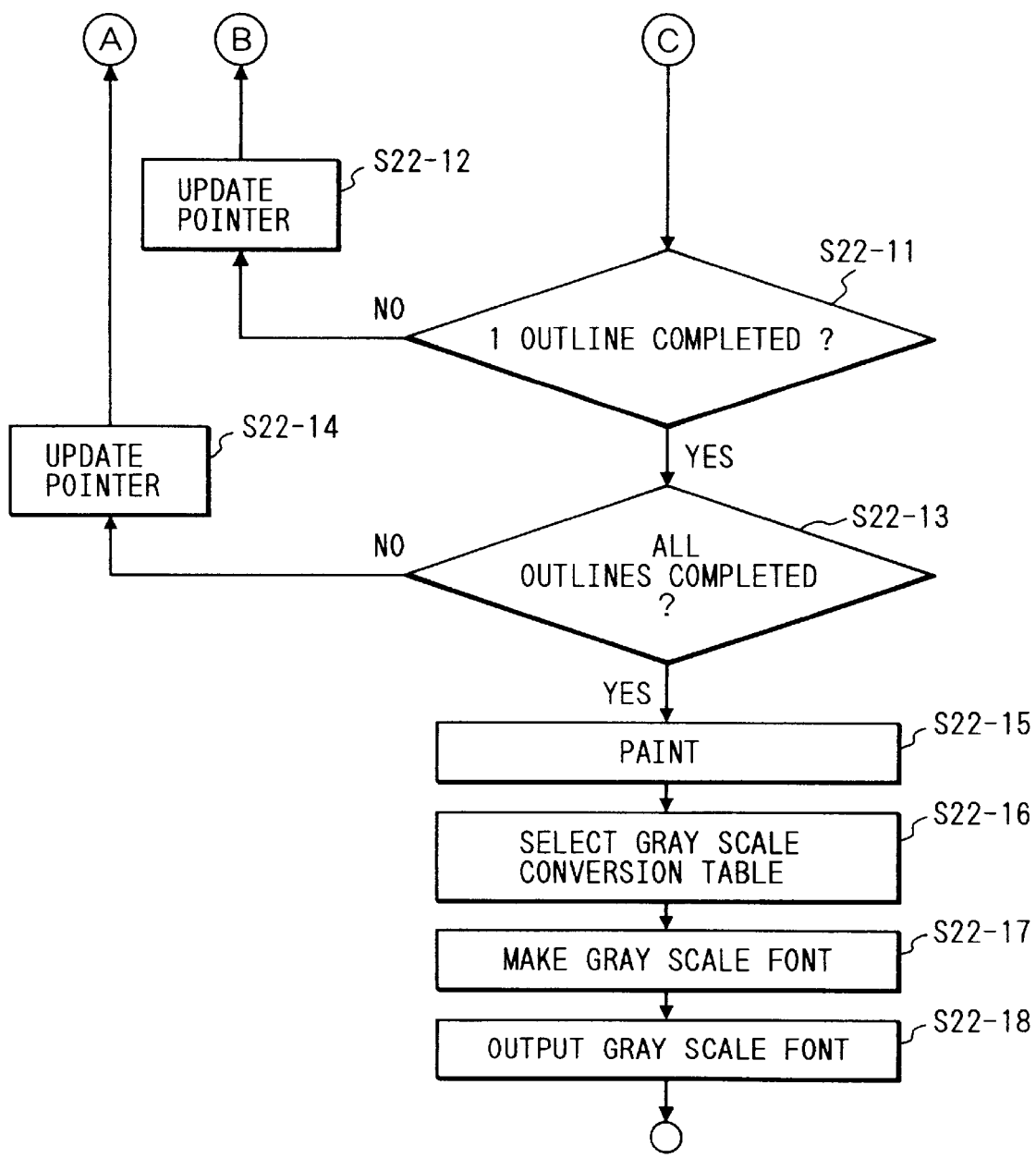
FIG. 22 is comprised of FIGS. 22A and 22B illustrating flowcharts showing the general processing for an additional embodiment of the present invention.

When the first embodiment is applied for the gray scale font, the processing in such a case is performed as is shown in the flowcharts in FIGS. 22A and 22B. Since this flowchart is substantially the same as that in the flowchart for the generation of a bit mapped font or for the output of outline coordinates, which have been explained in the first embodiment, and since the steps in FIGS. 22A and 22B almost match those in FIGS. 3A and 3B, only the steps whereat the procedures differ due to the generation of the gray scale font will be explained. The different steps are steps 22-1 and 22-4, and steps 22-16 and 22-17 are additionally provided. At step 22-1, input parameters are received, to include gray scale information. The input parameters are a character code, a style, weight information, a character output size, a gray level, an output form, a characteristic of an output device, etc. The character code that is employed is determined by specifying which character code system will be used as an object system: JIS code, shift JIS code, EUC code, or UNI code. The style is selected from the data for the styles mincho, gothic, round gothic, etc., that are incorporated in the system in advance, or data that are added as options. At this time, the above data are exactly the same as the data for the generation of the bit mapped fonts, and specific data for the generation of a gray scale font are not stored. The weight information concerning the thickness of a line of the style, and in this embodiment, information for ultra fine, fine, medium, bold, and ultra bold is given. The character output size is information about the size in which the font data is actually to be output, and the size in the x direction and in the y direction is requested. The gray level is information that indicates a gray scale level to be employed to prepare a gray scale font. This gray scale is determined to be 4, 16, or 256 level, in consonance with the characteristic of the output device. The output form is an output data form for a desired font, and includes a data output form, a bit mapped font output form, a gray scale font output form, and a one-dot form. The one-dot form is employed to designate the representation form, whether one byte represents one dot of the gray scale font, or two dots or four dots of that font. The characteristic of the output device is information about how a gray scale value should be determined to obtain an optimal gray scale font relative to an object output device. At step 22-4, the increase/reduction process is performed for coordinate data that are read at step 22-2 by using the output size and the gray level of a gray scale font. Supposing that a requested output size is (Ax, Ay), each coordinate values that is acquired at step 3-3 is (x, y), each coordinate value that is acquired after the enlargement/reduction process is performed is (X, Y), and the stored size of a character frame is (Mx, My), the calculation for the increase and reduction is represented as follows:

$$(X, Y) = (x \times \sqrt{n} \times Ax/Mx, y \times \sqrt{n} \times Ay/My) \quad (4)$$

Figure 24:
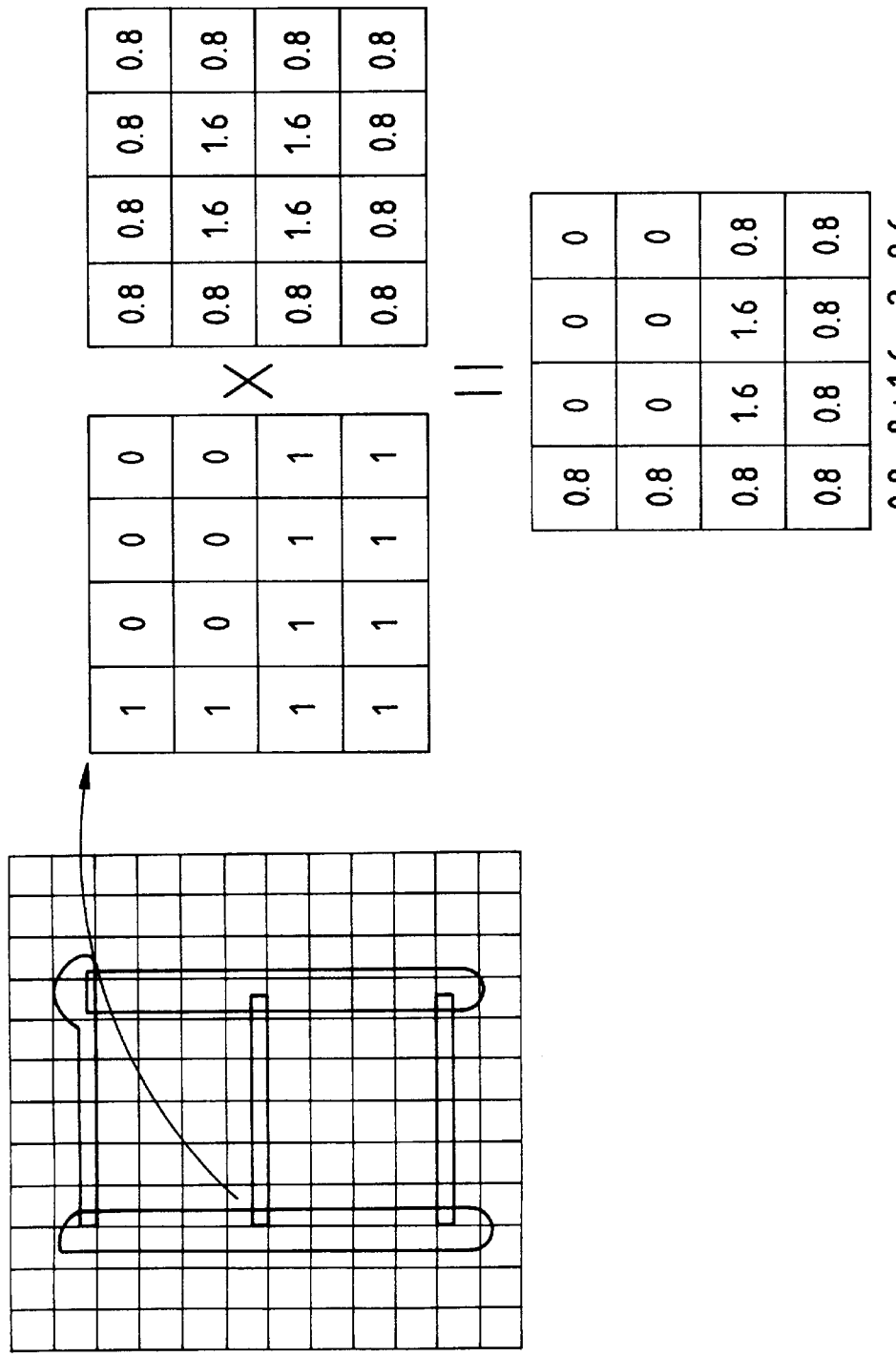
FIG. 24 is a diagram showing how the style is changed to a gray scale font.
Figures 25, 26:
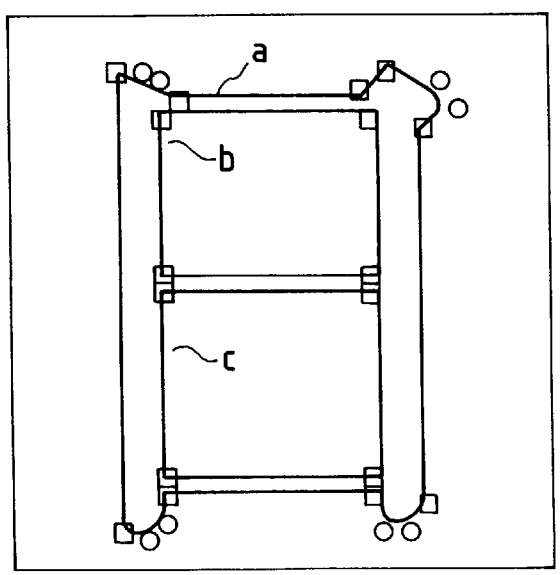
FIG. 25 is a diagram showing the bit map when the style is changed to a gray scale font.
FIG. 26 is a diagram for explaining an outline font for an outline with no crossing that is employed in the present invention.

At steps 22-16 and 22-17, a gray scale font is prepared from the bit mapped font that is created at step 22-15. First, at step 22-16, a gray scale conversion table is selected according to the characteristic of the output device that is received as an input parameter. As is shown in FIGS. 23A, 23B and 23C, the gray scale font conversion tables are 4×4 masks for 16 gray scales, wherein values for representing the characteristic of the output device are stored in advance. In FIG. 23A is shown an example table wherein the intensity characteristic of the output device is uniform. In FIG. 23B is shown an example table where the intensity is high at the center dots and low at the peripheral dots. In FIG. 23C is shown an example table wherein the intensity is high at the peripheral dots and low at the center dots. A table that is most appropriate for the intensity characteristic of the output device is selected from among them. At step 22-17, a gray scale font is created based on the table that is selected at step 22-16. This process will be explained by using the example in FIG. 24. In FIG. 24 is shown a bit mapped font that is acquired at step 22-15, and the vertical and horizontal size of the font is n times as large as the gray level n. Therefore, the bit mapped font is divided vertically and horizontally by n to extract grid squares of n×√n. In one of the grid squares, the bit values for each bit square are multiplied by the value of a corresponding bit square in the table that is acquired at step 22-16. All the resultant products of the multiplication are added to provide a gray scale value for an object dot. In FIG. 24 is shown an example wherein, to output a 16 level gray scale font, a table in FIG. 23B is selected for 4×4 bit squares. The above process is performed for all the grid squares, and thus a gray font scale as is shown in FIG. 25 can be provided. At step 22-18, the gray scale font is stored in consonance with the output form and the data is returned to the request side. When such an output form is requested wherein one dot is represented by one byte, the values in the individual grid squares are compressed in one byte and stored. When the output form is requested wherein data for two adjacent points are combined into one byte, the data are stored with one dot being packed into four bits, and are returned to the request side. The process is thereafter terminated.

[Fourth Embodiment]

In the first through the third embodiments, weight (thickness) conversion is performed when vector data are represented by coordinate data, which form each stroke of a character.

Figure 27:
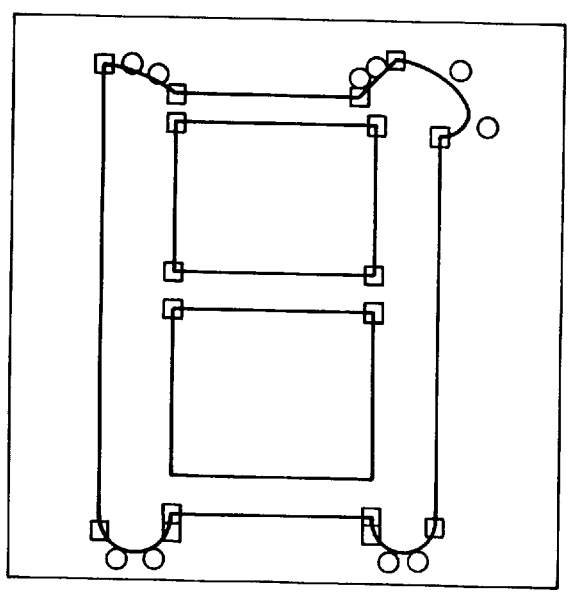
FIG. 27 is a diagram for explaining an outline font for an outline with no crossing strokes that is converted in the present invention.

In a fourth embodiment, weight conversion is performed for a case wherein vector data is represented by coordinate data for an outline of a character. The character shape is shown in FIG. 26. As is apparent from FIG. 26, there are no crossing strokes in the outline. The process for thickening the character in FIG. 26 into, for example, that shown in FIG. 27 will now be explained. In FIG. 28 is shown the format for the outline coordinate data that are stored in the ROM for a character and that are employed in this embodiment. These explanatory examples are easily understood when compared with those in FIGS. 4 through 6, which relate to a character for which vector data are formed by coordinate data that constitute each stroke of that character. In FIG. 28, stored data are coordinate data in which the characteristic of the outline of a character is represented. Attribute information, such as a straight line data/curved line data determination flag and an outline start point/end point flag, is provided for each coordinate point. Although the interpolation for curved line data may be for the second or the second B spline curve, or the second or the third Bezier curve, the interpolation to be employed as is determined in advance. The minimum coordinate value that represents a character frame is 0 and the maximum value is 800, etc.

Figure 29B:
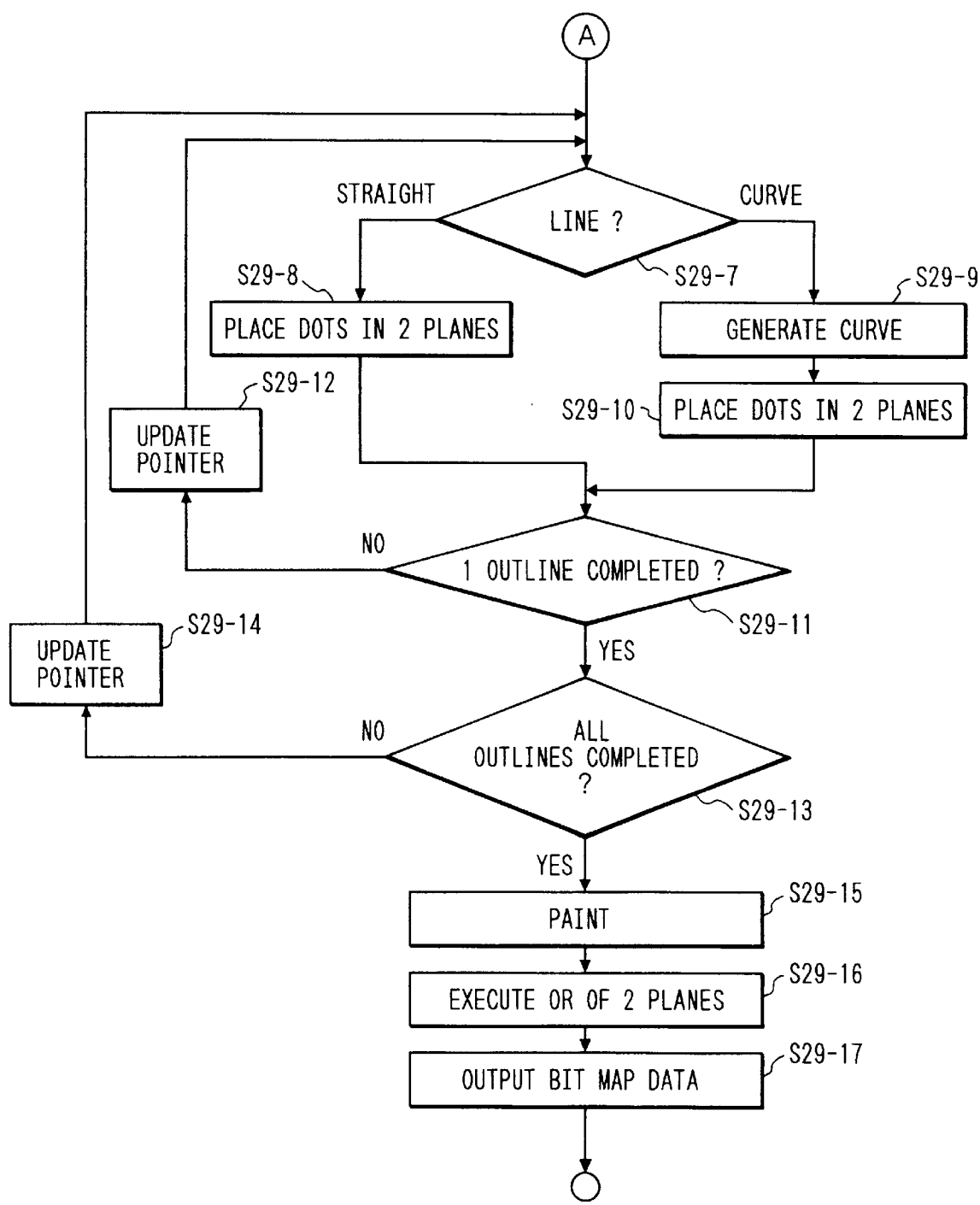
FIG. 29 is comprised of FIGS. 29A and 29B illustrating flowcharts showing the general processing for an outline font with no crossing strokes according to the present invention.

FIGS. 29A and 29B are flowcharts for explaining a weight conversion process using such data. Since the flowchart in FIGS. 29A and 29B has many portions that correspond to those in the flowchart in FIGS. 3A and 3B, only those procedure steps that are different will be explained. Although the data to be processed are different, the procedures at steps 29-1 through 29-7 are identical to those at steps 3-1 through 3-7 in FIGS. 3A and 3B, except for the thickening/narrowing process at step 29-3. Therefore, no explanation for these steps will be given. The process at step 29-3 will be described later in detail while referring to the flowchart in FIGS. 34A and 34B.

Figure 30:
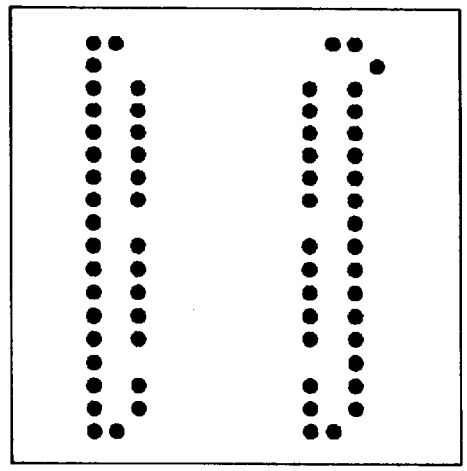
FIG. 30 is a diagram showing an XOR plane for painting by using coordinate data.
Figure 31:
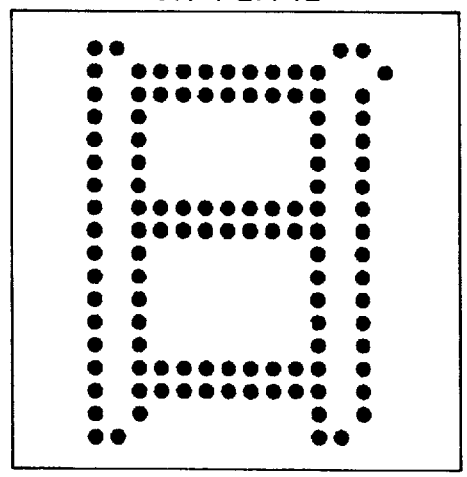
FIG. 31 is a diagram showing an outline OR plane that is prepared by employing coordinate data.

The process for generating a straight line is performed at step 29-8. Although the DDA is employed as at step 3-8 in FIGS. 3A and 3B to generate a straight line, such generation is performed for two planes. One of the planes is an XOR painting plane, and the other plane is an OR outline plane. The OR outline plane is provided to correct bits that are omitted in the XOR painting plane. This process will be explained while referring to FIG. 30, which shows the XOR painting plane, and to FIG. 31, which shows the OR outline plane. Only one X coordinate is set for one Y coordinate in the XOR painting plane in FIG. 30. In a painting process (step 29-16) which will be described later, each line is scanned from left to right, and an interval from an odd number bit of "1" to an even number bit of "1" is painted with "1". Thus, unless one X coordinate is provided for one Y coordinate, painting can not be performed preferably. To set a point in the XOR painting plane, exclusive OR (XOR) logical calculation is performed for a value of an object coordinate point in the XOR painting plane and a "1". The result is held at the object coordinate point in the XOR painting plane. When a point is set in the other plane, which is the OR outline plane in FIG. 31, all the X coordinate values along a straight line relative to one Y coordinate value are set to "1". In the OR outline plane, bits that are omitted from the XOR painting plane can be compensated for.

The process for generating a curve is performed at steps 29-9 and 29-10. These steps are the same as steps 3-9 and 3-10 in FIGS. 3A and 3B, except for a process for setting points for two planes that is performed for the straight line, and no explanation for these steps will be given.

Since steps 29-11 through 29-14 are also the same as steps 3-11 through 3-14 in FIGS. 3A and 3B, no explanation for them will be given here.

Figure 32:
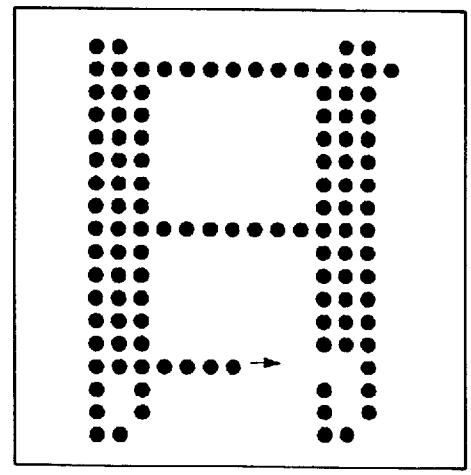
FIG. 32 is a diagram showing the painting being performed in the painting plane.
Figure 33:
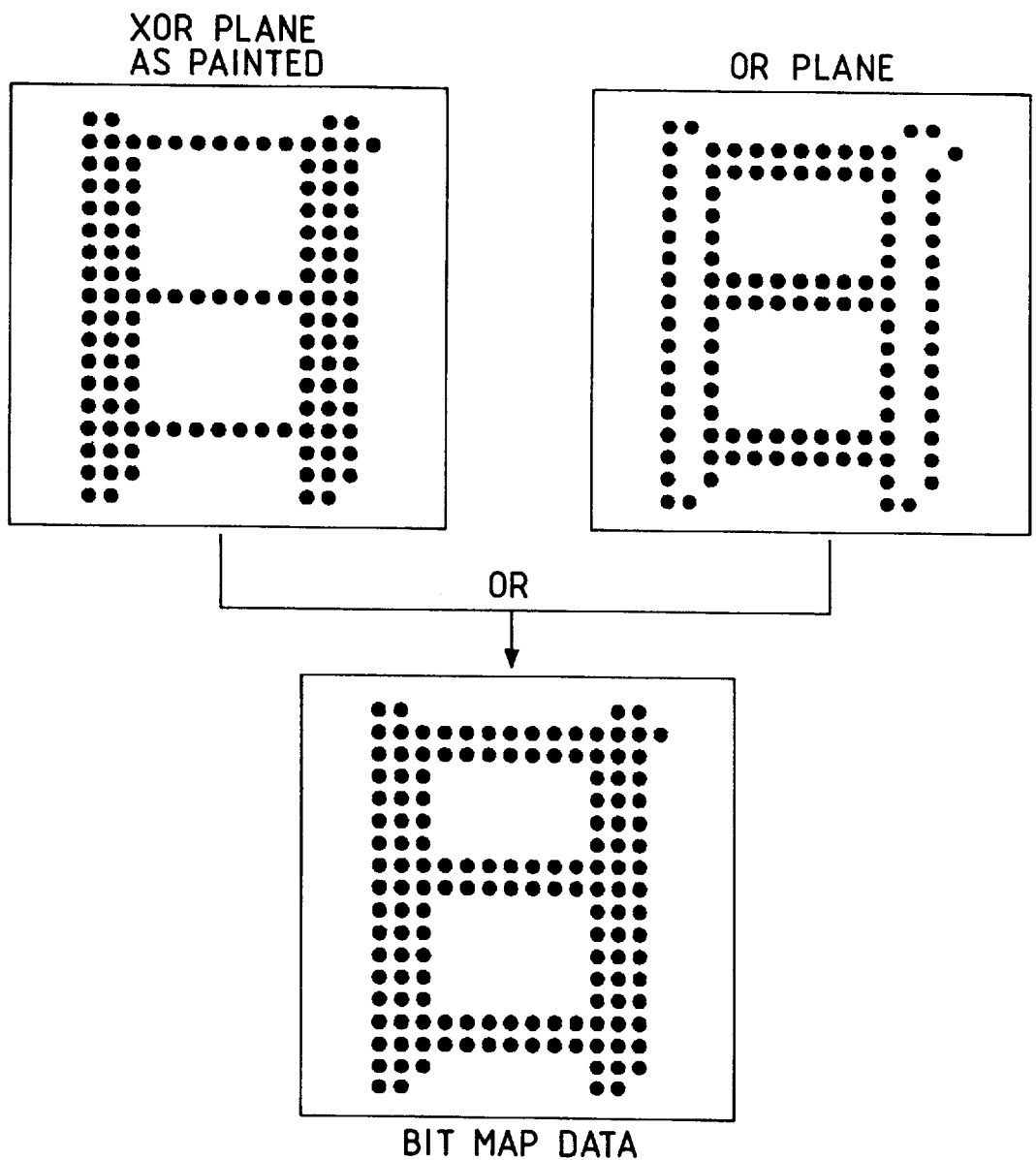
FIG. 33 is a diagram showing how a bit mapped font is produced.

At step 29-15, a painting process is performed for the painting plane. This process will be explained while referring to FIG. 32. As is indicated by an arrow in FIG. 32, the painting plane is scanned from left to right along each scan line, and an interval between an odd number bit of "1" and an even number bit of "1" is painted with a "1". This process is performed for all the scan lines. At step 29-16, an OR for the XOR painting plane and the OR outline plane is calculated to complete a bit map data for a single character. This process is shown in FIG. 33. At step 29-17, for example, bit map data for a single character that are acquired at step 29-16 are returned to a storage area that is designated by the request side, and the process is thereafter terminated.

Figure 34B:
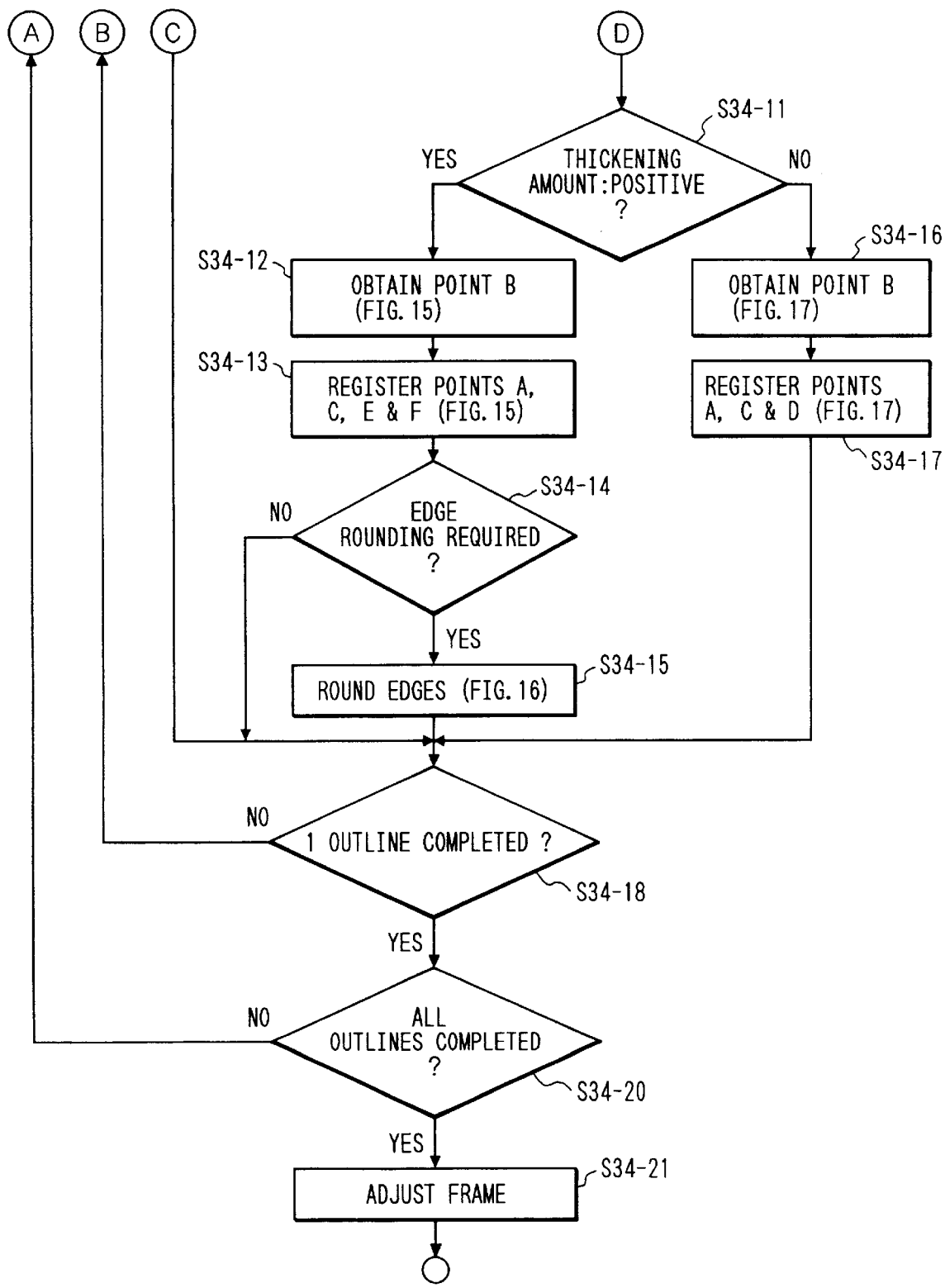
FIG. 34 is comprised of FIGS. 34A and 34B illustrating detailed flowcharts showing the process for thickening outline data for an outline with no crossing strokes.

The thickening/narrowing process at step 29-3 in FIGS. 29A and 29B will be described in detail while referring to the flowchart in FIGS. 34A and 34B. Since there are many overlaps in this process and in the process explained while referring to FIGS. 10A and 10B, only procedures that are different will be explained.

Since thickening/narrowing parameters differ for an exterior outline and for an interior outline that form a character, the outlines must be distinguished. For the thickening/narrowing process, an exterior outline thickening/narrowing parameter is employed for an exterior outline, while an interior outline thickening/narrowing parameter is employed for an interior outline. This thickening/narrowing process is different from that in FIGS. 10A and 10B. This process is performed at steps 34-1 through 34-5.

Suppose that a point row for an exterior outline is arranged counterclockwise and that a point row for an interior outline is arranged clockwise. In this case, the arrangement of the outline points is examined to distinguish whether it is an exterior outline or an interior outline. The clockwise arranged point row may be regarded as an exterior outline and the counterclockwise arranged point row may be regarded as an interior outline.

Figure 35:
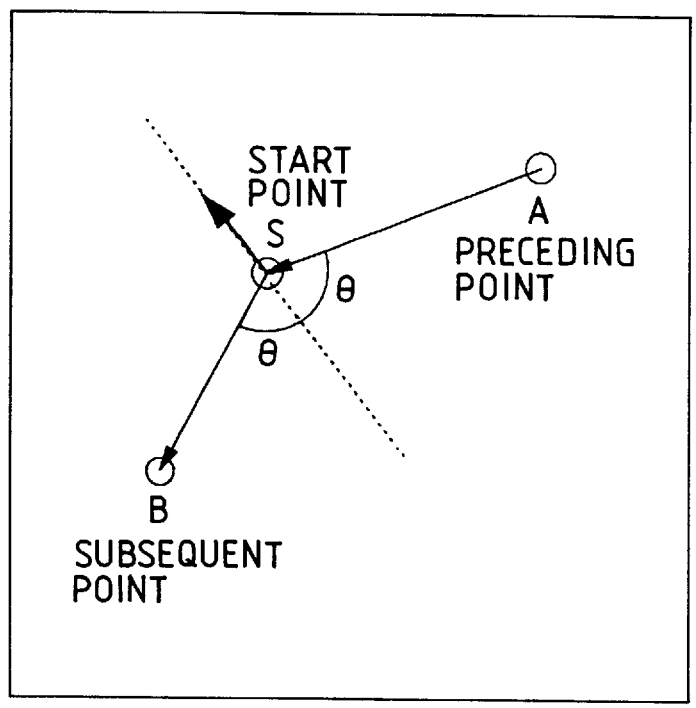
FIG. 35 is a diagram for explaining tentative shifting of a start point.

A pre-process for such determination is performed at steps 34-1 through 34-3. This process will be explained while referring to FIG. 35. At step 34-1, start point S in FIG. 35 is obtained, and at step 34-2, two points A and B that are adjacent to the start point S in FIG. 35 are extracted. Point A is a point (the last point of a pertinent outline) that precedes the start point S, and point B is a point that succeeds the start point S. In FIG. 35, a point for which the pre-process is to be performed is set in a direction in which an angle that is formed with vector AS and vector SB is divided into two. For the exterior outline, i.e., for the counterclockwise point row, this point is located away from the start point S a specific distance toward the right along the direction of a vector. For the interior outline, i.e., for the clockwise point row, the pre-processing point is located away from the start point S a specific distance toward the left along the direction of the vector. This is performed at step 34-3. At step 34-4, a check is performed to determine whether or not an object outline that is based on the pre-processing point is an exterior outline or an interior outline. This process will be described in detail while referring to the flowchart in FIG. 40.

Figure 36:
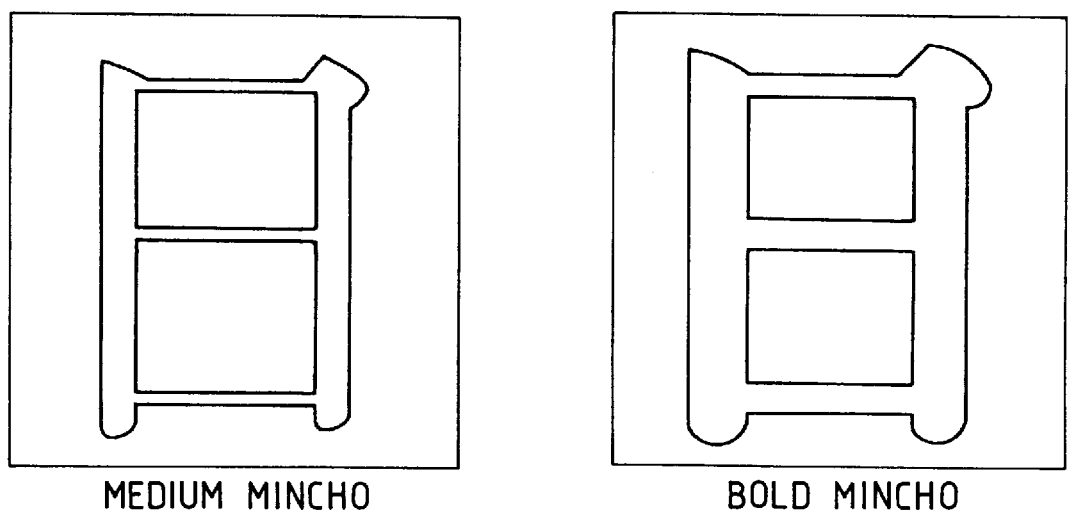
FIG. 36 is a diagram showing the resultant mincho style after it is thickened.
Figure 37A:
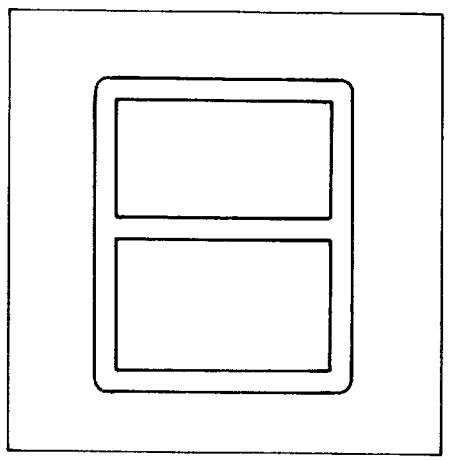
FIGS. 37A and 37B are diagrams showing the resultant round gothic style after it is processed.
Figure 37B:
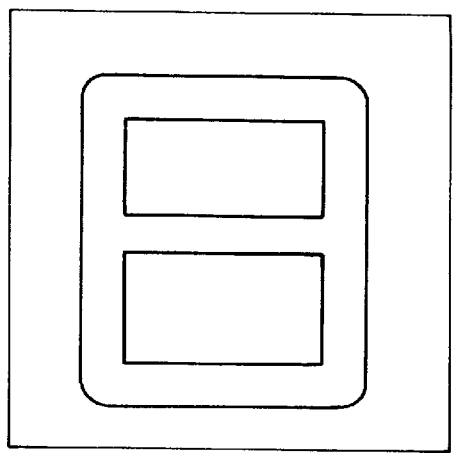

At step 34-5, the parameters for the thickness of the exterior outline and for the thickness of the interior outline are determined in consonance with the weights. The parameters that determine these thicknesses have independent values for the exterior outline and the interior outline in the x direction and in the y direction, and the thickening amount for the horizontal line and the thickening amount for the vertical line are managed separately. Since, as is shown in FIG. 36, the vertical line in the mincho style must be thickened very much while the horizontal line need not be thickened much, different values must be set for the x direction and for the y direction. To thicken the round gothic style, the character is thickened vertically and horizontally by substantially the same amount, as is shown in FIGS. 37A and 37B. This method is the same as at step 10-1 in FIGS. 10A, 10B, 11A, 11B, 12A and 12B. As is shown in FIG. 38, relative to the horizontal line and the vertical line of each style and weight, each reference data value for an interval that extends from the center of a line to an exterior outline or to an interior outline is entered in a table in advance. The thickening values for an exterior outline and for an interior outline are determined in the x direction and in the y direction by referring to the weight, of the coordinate data, that is to be output for the style and the weight of the input object coordinate data.

Figure 39:
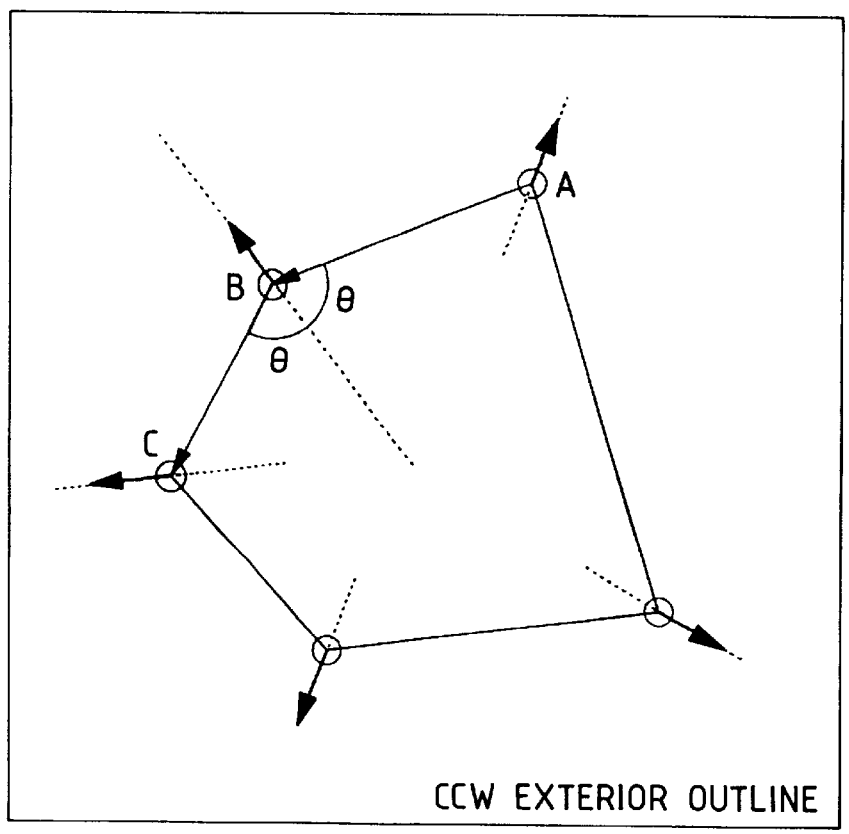
FIG. 39 is a diagram showing the state when the thickening process is being performed.

Since the process at steps 34-6 through 34-21 is the same as that in FIGS. 10A and 10B, even though object coordinate data are different, no explanation for that process will be given. It should be noted that this process differs from the process in FIGS. 10A and 10B in that this process includes procedures for both an exterior outline and an interior outline. At step 34-10 to perform the thickening process for a less sharp angle for the exterior outline, i.e., the counterclockwise point row, an object point is moved to the right (see FIG. 39). When the point row of the exterior outline is clockwise, the object point is moved to the left. In the thickening process, the object point for the exterior outline is shifted in a direction of thickening, and program control moves to step 34-12. Since the object point for the interior outline is shifted in the direction of narrowing, program control goes to step 34-16. For the narrowing process, the above cases are performed inversely.

Figure 41:
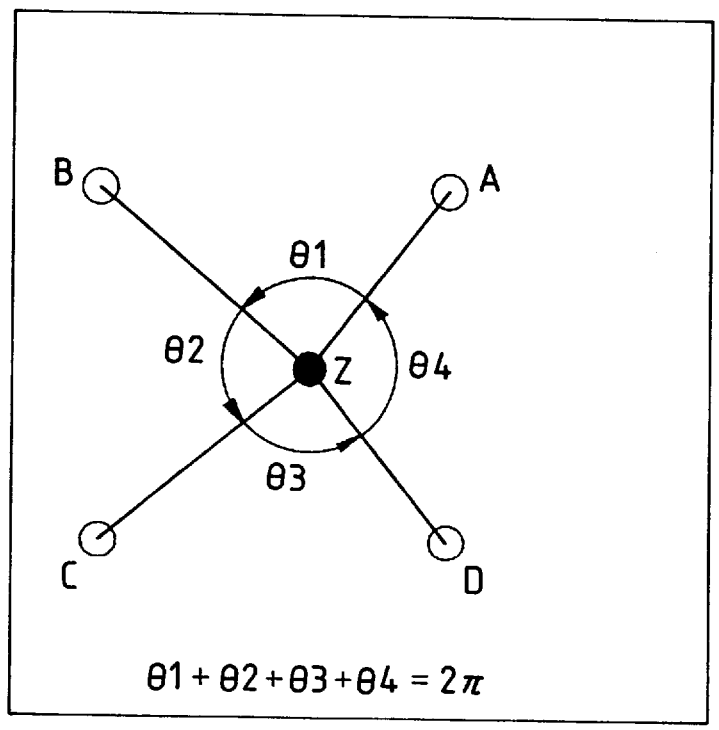
FIG. 41 is a diagram for explaining the determination of an interior outline.
Figure 42:
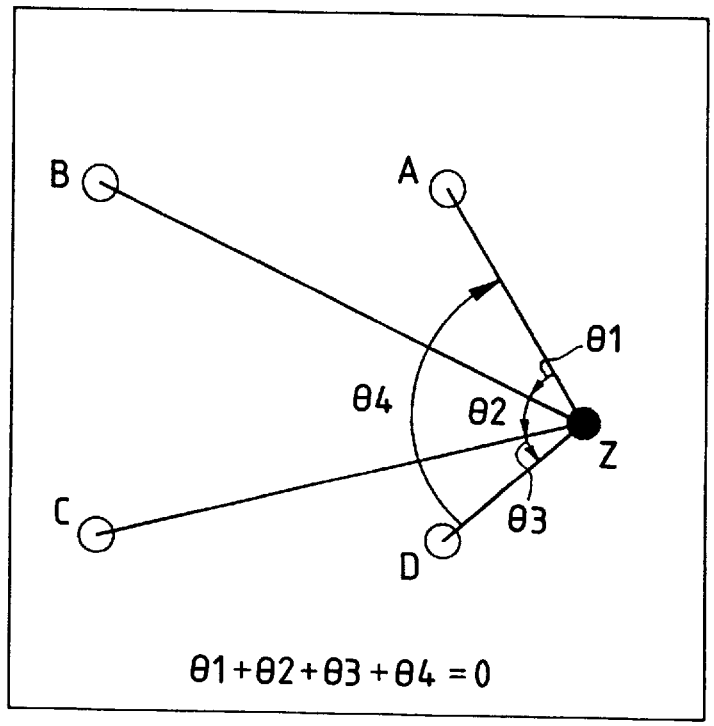
FIG. 42 is a diagram for explaining the determination of an exterior outline.

The exterior outline/interior outline determination process at step 34-4 in FIGS. 34A and 34B will now be described while referring to the flowchart in FIG. 40. As is shown in FIG. 41, with the counterclockwise value being positive, angles $\theta_1$ through $\theta_4$ are calculated that are formed by point Z and coordinate points A, B, C, D and E, which form the outline. When the total angle of the angles $\theta_1$ through $\theta_4$ is $2\pi$, the point Z is determined to be located inside the outline. As is shown in FIG. 42, when the sum of the angles $\theta_1$ through $\theta_4$, which are formed by points A through D, which form the outline, and the point Z, is 0, the point Z is assumed to be located outside the outline. This process is shown in the flowchart in FIG. 40. Since the point Z is acquired at steps 34-1 through 34-3, the sum of the angles from the point Z is calculated as is shown in the flowchart in FIG. 40. At step 40-1, the initialization is performed with the sum $T_\theta$ of angles being 0. At step 40-2, two adjacent points are extracted, and at step 40-3, the point Z and the two extracted points are connected together by a vector, and an angle $\theta$ that is formed by these points is calculated. The angle $\theta$ can be acquired by calculating an outer product. The acquired value $\theta$ is added to the angle sum $T_\theta$ at step 40-4. At step 40-5, a check is performed to determine whether or not two points have been extracted for all the points of a single outline. When the calculations have been completed for all the points, program control advances to step 40-6. When the calculations have not yet been completed, program control returns to step 40-2 to continue the calculation process. At step 40-6, a check is performed to determine whether the angle sum $T_\theta$ is 0 or $2\pi$. When the angle sum $T_\theta$ is 0, an object point is assumed to be for an exterior outline, and an exterior outline flag is set. When the angle sum $T_\theta$ is $2\pi$, an object point is assumed to be for an interior outline, and an interior outline flag is set. At the following process, this flag is employed to determine whether the object point is for an exterior outline or for an interior outline.

[Fifth Embodiment]

A fifth embodiment corresponds to the previously described second embodiment, and shows an example where two or more identical styles exist in the system when coordinate data are represented by an outline that has no crossing strokes. In this case, as in the flowchart in FIG. 19, there is less degradation in quality when the thickening process is performed than when the narrowing process is performed. Coordinate data for an outline, which has a smaller weight than a requested weight, is selected. An explanation for this process will not be given because this is the same as the process described in the flowchart in FIG. 19.

FIG. 43A and 43B are tables that is employed in this embodiment and that corresponds to the table shown in FIGS. 20A and 20B.

[Sixth Embodiment]

Figure 44B:
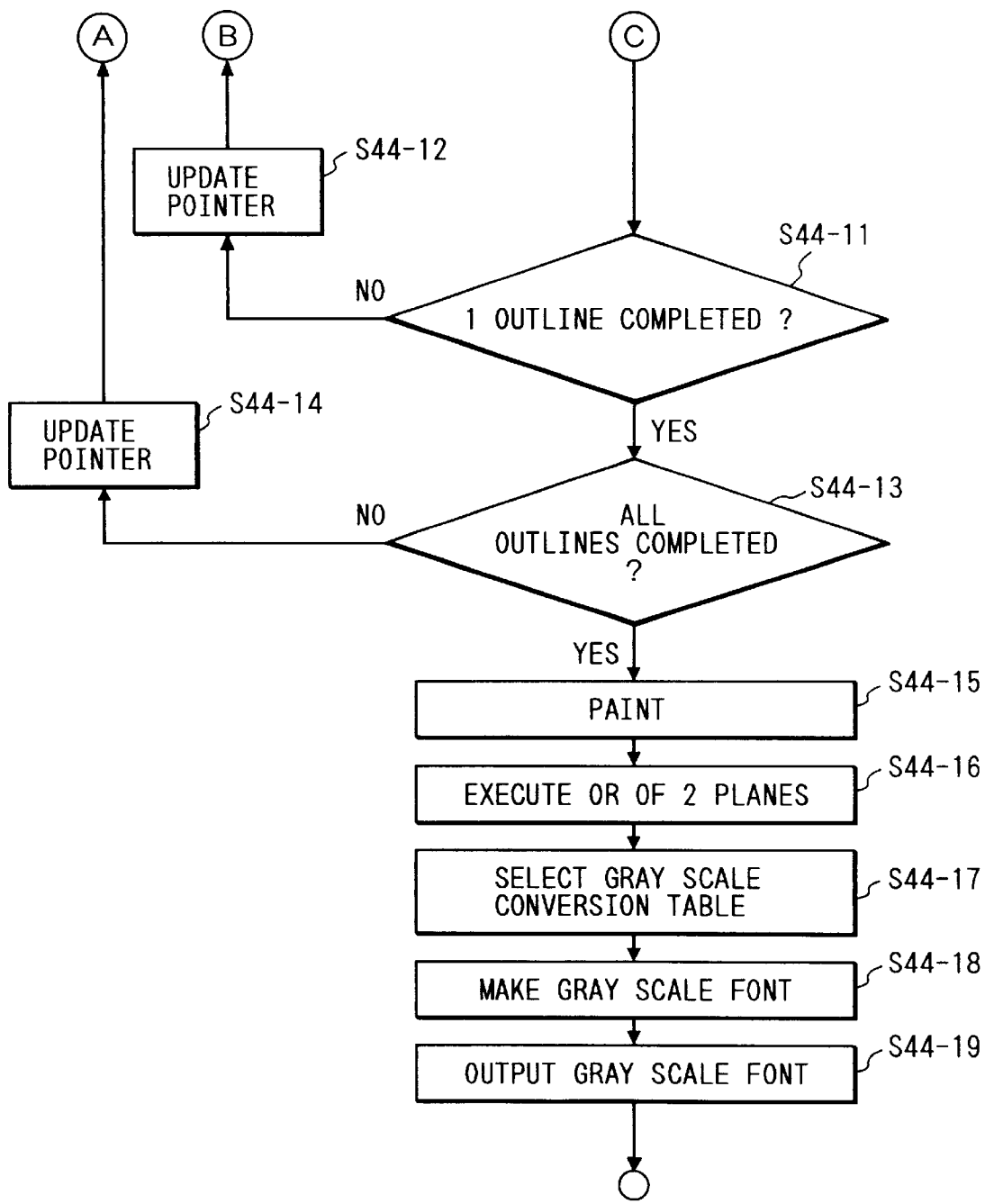
FIG. 44 is comprised of FIGS. 44A and 44B illustrating flowcharts for producing a gray scale font.

A sixth embodiment corresponds to the previously described third embodiment, and shows an example where a thickening process is performed for a gray scale font when coordinate data are represented by an outline that has no crossing strokes. This process is shown in the flowchart in FIGS. 44A and 44B. The processing in this flowchart in FIGS. 44A and 44B is the same as that in the flowchart in FIGS. 22A and 22B, with the exception that the process for two planes is performed as in the flowchart in FIGS. 29A and 29B. The process shown in FIGS. 44A and 44B will therefore not be explained. The process in FIGS. 44A and 44B becomes apparent by referring to FIGS. 22A and 22B while taking into consideration the differences between the processes in FIGS. 3A and 3B and in FIGS. 29A and 29B.

The present invention may be achieved either by a system that includes a plurality of apparatuses, or by a system that has a single apparatus. In addition, the present invention can be employed in a system or an apparatus that can achieve the present invention by supplying a program to the system or to the apparatus.

As is described above, according to the present invention, based on an input thickening amount or a narrowing amount, a coordinate value for outline data is converted, a coordinate value that is to be adjusted is extracted and adjusted, and the adjusted outline data are employed to generate a thick or narrow character pattern. A boldface or lightface of high quality with different thicknesses can be provided with a small amount of character data.

According to the present invention, character data that are to be changed is determined in consonance with the input thickening amount or narrowing amount, the coordinate value of the outline data that correspond to the determined character data is transformed, and the outline data whose coordinates have been transformed are employed to provide a thick or narrow character pattern. The character data sources are utilized to provide the best boldface or lightface character data.

According to the present invention, data for a character whose thickness is close to the input thickening amount or the narrowing amount is determined as character data that are to be transformed, so that more accurate boldface or lightface character data can be produced.

In addition, according to the present invention, the coordinate values of two points, which are adjacent to an object coordinate, are referred to in order to determine one set of transformed coordinates. A well-balanced boldface or lightface character pattern can be provided.

According to the present invention, the transformation is performed by varying extracted outline data independently in the x direction and y direction according to the thickening amount or the narrowing amount that is input. A boldface or lightface character pattern on which the characteristic of each style is reflected can be generated.

According to the present invention, the object coordinates and the coordinate values of two adjacent points are referred to, and the shape of an outline is determined by examining whether or not an angle formed by the three points and an input value indicate the thickening amount or the narrowing amount, and by an object style. Therefore, a boldface or light face character pattern of high quality can be produced.

According to the present invention, since the coordinate adjustment is performed by inserting a new point as an object point when the thickening amount is selected, a boldface character pattern of high quality can be produced.

According to the present invention, since the coordinate adjustment is performed by inserting a new point as an object point when the thickening amount is designated, and by rounding the corner edges, a preferable boldface character pattern that reflects the characteristic for each style can be produced.

According to the present invention, if the coordinate adjustment is performed by moving an object point when the narrowing amount is designated, a lightface character pattern of high quality can be produced.

According to the present invention, for data generation, either a bit mapped font, outline data, or a gray scale font is output in consonance with transformed outline data, and boldface or lightface character data can be supplied in an appropriate data format to various output means.

The outline data may be constituted by a plurality of outline data that have crossing strokes, or by a plurality of outline data that have no crossing strokes.

Therefore, character data for various weights can be generated while employing a small memory capacity.

What is claimed is:

1. An information processing apparatus comprising:
    thickening means for thickening an outline of a pattern comprising a plurality of strokes, the outline comprising a plurality of outline points;
    discrimination means for discriminating, for each adjacent two of the plurality of strokes of the outline thickened by said thickening means crossing over each other at a crossing angle, whether or not the angle is equal to or less than a predetermined value; and
    correction means for correcting outline points on adjacent two strokes crossing over each other at a crossing angle if said discrimination means discriminates that the crossing angle is equal to or less than the predetermined value.

2. An apparatus according to claim 1, wherein said correction means corrects the outline points by moving the outline points on an outer outline toward the outline points on an inner outline when said thickening means thickens the outline by a positive thickening amount.

3. An apparatus according to claim 1, wherein said correction means corrects the outline points by moving the outline points on an inner outline toward the outline points on an outer outline when said thickening means thickens the outline by a negative thickening amount.

4. An apparatus according to claim 1, wherein said correction means does not correct the outline points on adjacent two strokes crossing over each other at a crossing angle if said discrimination means does not discriminate that the crossing angle is equal to or less than the predetermined value.

5. An apparatus according to claim 1, wherein the outline is provided for each stroke.

6. An apparatus according to claim 1, wherein the outline is not provided for each stroke.

7. An apparatus according to claim 1, wherein the pattern comprises a character pattern.

8. An apparatus according to claim 1, further comprising output means for outputting the pattern whose pattern is thickened by said thickening means.

9. An apparatus according to claim 8, wherein said output means comprises a printer.

10. An apparatus according to claim 8, wherein said output means comprises a display.

11. An information processing method comprising the steps of:
    thickening an outline of a pattern comprising a plurality of strokes, the outline comprising a plurality of outline points;
    discriminating, for each adjacent two of the plurality of strokes of the thickened outline crossing over each other at a crossing angle, whether or not the angle is equal to or less than a predetermined value; and
    correcting outline points on adjacent two strokes crossing over each other at a crossing angle if said discrimination step discriminates that the crossing angle is equal to or less than the predetermined value.

12. A method according to claim 11, wherein said correcting step corrects the outline points by moving the outline points on an outer outline toward the outline points on an inner outline when said thickening step thickens the outline by a positive thickening amount.

13. A method according to claim 11, wherein said correcting step corrects the outline points by moving the outline points on an inner outline toward the outline points on an outer outline when said thickening step thickens the outline by a negative thickening amount.

14. A method according to claim 11, wherein said correcting step does not correct the outline points on adjacent two strokes crossing over each other at a crossing angle if said discrimination step does not discriminate that the crossing angle is equal to or less than the predetermined value.

15. A method according to claim 11, wherein the outline is provided for each stroke.

16. A method according to claim 11, wherein the outline is not provided for each stroke.

17. A method according to claim 11, wherein the pattern comprises a character pattern.

18. A method according to claim 11, further comprising an output step for outputting the pattern whose pattern is thickened by said thickening step.

19. A method according to claim 18, wherein said output step comprises a printer.

20. A method according to claim 18, wherein said output step comprises a display.

21. A memory medium storing computer-executable process steps, the process steps comprising:
    a thickening step for thickening an outline of a pattern comprising a plurality of strokes, the outline comprising a plurality of outline points;
    a discriminating step for discriminating, for each adjacent two of the plurality of strokes of the thickened outline crossing over each other at a crossing angle, whether or not the angle is equal to or less than a predetermined value; and
    a correcting step for correcting outline points on adjacent two strokes crossing over each other at a crossing angle if said discrimination step discriminates that the crossing angle is equal to or less than the predetermined value.

22. A memory medium storing computer-executable process steps according to claim 21, wherein said correcting step corrects the outline points by moving the outline points on an outer outline toward the outline points on an inner outline when said thickening step thickens the outline by a positive thickening amount.

23. A memory medium storing computer-executable process steps according to claim 21, wherein said correcting step corrects the outline points by moving the outline points on an inner outline toward the outline points on an outer outline when said thickening step thickens the outline by a negative thickening amount.

24. A memory medium storing computer-executable process steps according to claim 21, wherein said correcting step does not correct the outline points on adjacent two strokes crossing over each other at a crossing angle if said discrimination step does not discriminate that the crossing angle is equal to or less than the predetermined value.

25. A memory medium storing computer-executable process steps according to claim 21, wherein the outline is provided for each stroke.

26. A memory medium storing computer-executable process steps according to claim 21, wherein the outline is not provided for each stroke.

27. A memory medium storing computer-executable process steps according to claim 21, wherein the pattern comprises a character pattern.

28. A memory medium storing computer-executable process steps according to claim 21, further comprising an output step for outputting the pattern whose pattern is thickened by said thickening step.

29. A memory medium storing computer-executable process steps according to claim 28, wherein said output step comprises a printer.

30. A memory medium storing computer-executable process steps according to claim 28, wherein said output step comprises a display.

\* \* \* \* \*

UNITED STATES PATENT AND TRADEMARK OFFICE
CERTIFICATE OF CORRECTION

PATENT NO. : 5,852,680

DATED : December 22, 1998

INVENTOR : Masayuki Yoshida

It is certified that error appears in the above-identified patent and that said Letters Patent is hereby corrected as shown below:

COLUMN 3

Line 58, "stokes" should read --strokes--.

COLUMN 5

Line 30, "program" should read --programs--.

COLUMN 9

Line 30, "$\cos \theta = \dfrac{\vec{ab} \cdot \vec{ac}}{|\vec{ab}| \times |\vec{ac}|}$"

should read --$\cos \theta = \dfrac{\vec{ab} \cdot \vec{ac}}{|\vec{ab}| \times |\vec{ac}|}$--; and Line 57, "or the" should read --the--.

UNITED STATES PATENT AND TRADEMARK OFFICE
CERTIFICATE OF CORRECTION

PATENT NO. : 5,852,680

DATED : December 22, 1998

INVENTOR : Masayuki Yoshida

It is certified that error appears in the above-identified patent and that said Letters Patent is hereby corrected as shown below:

<u>COLUMN 13</u>

Line 12, "correspond" should read --corresponds--; and
Line 62, "values" should read --value--.

Signed and Sealed this

Seventeenth Day of August, 1999

Attest:

Q. TODD DICKINSON

*Attesting Officer*     *Acting Commissioner of Patents and Trademarks*